(12) United States Patent
Heilmann et al.

(10) Patent No.: US 11,567,823 B2
(45) Date of Patent: Jan. 31, 2023

(54) METHOD FOR IDENTIFYING AND EVALUATING COMMON CAUSE FAILURES OF SYSTEM COMPONENTS

(71) Applicant: Siemens Aktiengesellschaft, Munich (DE)

(72) Inventors: Reiner Heilmann, Egmating (DE); Christof Kaukewitsch, Munich (DE); Marc Zeller, Munich (DE)

(73) Assignee: SIEMENS AKTIENGESELLSCHAFT

( * ) Notice: Subject to any disclaimer, the term of this patent is extended or adjusted under 35 U.S.C. 154(b) by 101 days.

(21) Appl. No.: 17/046,412

(22) PCT Filed: Apr. 10, 2019

(86) PCT No.: PCT/EP2019/059143
§ 371 (c)(1),
(2) Date: Oct. 9, 2020

(87) PCT Pub. No.: WO2019/201715
PCT Pub. Date: Oct. 24, 2019

(65) Prior Publication Data
US 2021/0049060 A1   Feb. 18, 2021

(30) Foreign Application Priority Data
Apr. 17, 2018  (EP) .................... 18167633

(51) Int. Cl.
*G06F 11/07* (2006.01)
(52) U.S. Cl.
CPC ........ *G06F 11/079* (2013.01); *G06F 11/0706* (2013.01); *G06F 11/0772* (2013.01); *G06F 11/0793* (2013.01)

(58) Field of Classification Search
CPC ............... G06F 11/008; G06F 11/0706; G06F 11/0772; G06F 11/079; G06F 11/0793
See application file for complete search history.

(56) References Cited

U.S. PATENT DOCUMENTS 6,820,044 B2 * 11/2004 Groen ................ G06F 11/008
703/2
9,122,253 B2 * 9/2015 Block ................ G06F 11/008
(Continued)

FOREIGN PATENT DOCUMENTS

| CN | 107038520 A | 8/2017 |
| WO | 2017139046 A1 | 8/2017 |

OTHER PUBLICATIONS

PCT International Search Report and Written Opinion of International Searching Authority dated May 28, 2019 corresponding to PCT International Application No. PCT/EP2019/059143 filed Apr. 10, 2019.

(Continued)

*Primary Examiner* — Joseph R Kudirka
(74) *Attorney, Agent, or Firm* — Schmeiser, Olsen & Watts LLP

(57) ABSTRACT

Provided is a method and system for identifying and evaluating common cause failures of system components, wherein at least one analytical artifact and machine readable system related to at least one of spatial, topological data and machine readable system related lifecycle data are processed to analyze automatically a susceptibility of system components to common cause failure based on common cause failure influencing factors.

20 Claims, 36 Drawing Sheets

(56) References Cited

U.S. PATENT DOCUMENTS

2013/0317780 A1* 11/2013 Agarwal ............ G05B 23/0248
702/181
2015/0142402 A1* 5/2015 Ramesh ............. G05B 23/0248
703/7
2017/0068581 A1* 3/2017 Qi ....................... G06F 11/0709

OTHER PUBLICATIONS

Habchi, Georges et al: "An overall methodology for reliability prediction of mechatronic systems design with industrial application"; Reliability Engineering and System Safety, Elsevier Applied Science, GB; vol. 155, Jul. 9, 2016 (Jul. 9, 2016), pp. 236-254, XP029683714.

* cited by examiner

FIG 4

Table 1: Power Supply Fire Sensor (Generic And Instantiation)

| | | |
|---|---|---|
| 1 | Power Supply Fire Sensor (generic) | extern |
| 2 | Inputs | Outputs |
| 3 | Input 1 | Output 1 |
| 4 | irrelevant | <voltage level, quality, criteria> |

| | | |
|---|---|---|
| 6 | Power Supply Fire Sensor (instantiation) | extern |
| 7 | Inputs | Outputs |
| 8 | Input 1 | Output 1 |
| 9 | irrelevant | 5V +- 10% |
| 10 | irrelevant | not (5V +- 10%) |

FIG 5

Table 2: Power Supply CPU (Generic And Instantiation)

| | | |
|---|---|---|
| 1 | Power Supply Fire Sensor (generic) | extern |
| 2 | Inputs | Outputs |
| 3 | Input 1 | Output 1 |
| 4 | irrelevant | <voltage level, quality, criteria> |

| | | |
|---|---|---|
| 6 | Power Supply Fire Sensor (instantiation) | extern |
| 7 | Inputs | Outputs |
| 8 | Input 1 | Output 1 |
| 9 | irrelevant | 5V +- 10% |
| 10 | irrelevant | not (5V +- 10%) |

FIG 6

FIG 6A

Table 3: Fire Sensor (Generic and Instantiation)

| | | | |
|---|---|---|---|
| 2 | Fire sensor (generic) | Intern | |
| 3 | Inputs | | |
| 4 | Input 1 (IR signal) | Input 2 (Power Supply) | internal state |
| 5 | irrelevant | not (5V +- 10%) | irrelevant |
| 6 | irrelevant | 5V +- 10% | Internal failure detected |
| 7 | IR present | 5V +- 10% | No internal failure detected |
| 8 | IR not present | 5V +- 10% | No internal failure detected |
| 9 | IR present | 5V +- 10% | No internal failure detected |
| 10 | IR not present | 5V +- 10% | No internal failure detected |
| 11 | irrelevant | 5V +- 10% | No internal failure detected |
| 12 | irrelevant | 5V +- 10% | No internal failure detected |

13
14
15

| | | | |
|---|---|---|---|
| 16 | Fire Sensor S1, type: | | |
| 17 | Fire Sensor (generic) | Intern | |
| 18 | Inputs | | |
| 19 | Input 1 (IR signal) | Input 2 (Power Supply) | internal state |
| 20 | irrelevant | not (5V +- 10%) | irrelevant |
| 21 | irrelevant | 5V +- 10% | Internal failure detected |
| 22 | IR present | 5V +- 10% | No internal failure detected |
| 23 | IR not present | 5V +- 10% | No internal failure detected |
| 24 | IR present | 5V +- 10% | No internal failure detected |
| 25 | IR not present | 5V +- 10% | No internal failure detected |
| 26 | irrelevant | 5V +- 10% | No internal failure detected |
| 27 | irrelevant | 5V +- 10% | No internal failure detected |

| Failure mode | Failure Rate | Preventive maintenance activity |
|---|---|---|
| no | n.a. | Inspect, clean. all |
| various | 500 | Inspect, clean. all |
| no | n.a. | Inspect, clean. all |
| no | n.a. | Inspect, clean. all |
| missed detection | 100 | Inspect, clean. all |
| false alarm | 500 | Inspect, clean. all |
| no output signal | 50 | Inspect, clean. all |
| deviation of output signal | 150 | Inspect, clean. all |
| | 1300 | |
| | Sum | |

| Failure mode | Failure Rate | Preventive maintenance activity |
|---|---|---|
| no | n.a. | Inspect, clean. all |
| various | 500 | Inspect, clean. all |
| no | n.a. | Inspect, clean. all |
| no | n.a. | Inspect, clean. all |
| missed detection | 100 | Inspect, clean. all |
| false alarm | 500 | Inspect, clean. all |
| no output signal | 50 | Inspect, clean. all |
| deviation of output signal | 150 | Inspect, clean. all |
| | 1300 | |
| | Sum | |

FIG 6C

| | |
|---|---|
| | Outputs |
| Corrective maintenance activity | Output |
| Exchange component | no signal |
| Exchange component | "Internal failure fire sensor", coded, repeated |
| Exchange component | "Fire", coded, repeated |
| Exchange component | "No fire", coded, repeated |
| Exchange component | "No fire", coded, repeated |
| Exchange component | "Fire", coded, repeated |
| Exchange component | no signal |
| Exchange component | deviating signal (none of the above coded signals) |

| | |
|---|---|
| | Outputs |
| Corrective maintenance activity | Output 1 |
| Exchange component | no signal |
| Exchange component | "Internal failure fire sensor", coded, repeated |
| Exchange component | "Fire", coded, repeated |
| Exchange component | "No fire", coded, repeated |
| Exchange component | "No fire", coded, repeated |
| Exchange component | "Fire", coded, repeated |
| Exchange component | no signal |
| Exchange component | deviating signal (none of the above coded signals) |

FIG 7

| FIG 7A | FIG 7B | FIG 7C | FIG 7D | FIG 7E | FIG 7F |

FIG 7A

Table 4: CPU (Generic and Instantiation)

| | | | |
|---|---|---|---|
| 2 | CPU (generic) | Intern | |
| 3 | Input 1 | Input 2 | Input 3 |
| 4 | \<Power\> | \<Digital signal, voltage range X\> | \<Digital signal, voltage range X\> |
| 5 | not (5V +- 10%) | irrelevant | irrelevant |
| 6 | 5V +- 10% | irrelevant | irrelevant |
| 7 | 5V +- 10% | \<Digital signal, voltage range X\> | \<Digital signal, voltage range X\> |
| 8 | 5V +- 10% | \<Digital signal, voltage range X\> | \<Digital signal, voltage range X\> |
| 9 | 5V +- 10% | \<Digital signal, voltage range X\> | \<Digital signal, voltage range X\> |
| 10 | 5V +- 10% | \<Digital signal, voltage range X\> | \<Digital signal, voltage range X\> |
| 11 | 5V +- 10% | \<Digital signal, voltage range X\> | \<Digital signal, voltage range X\> |
| 12 | | | |
| 13 | | | |
| 14 | | | |
| 15 | CPU (instantiation) type: | | |
| 16 | CPU (generic) | Intern | |
| 17 | Input 1 | Input 2 | Input 3 |
| 18 | \<Power\> | \<Digital signal, voltage range X\> | \<Digital signal, voltage range X\> |
| 19 | not (5V +- 10%) | irrelevant | irrelevant |
| 20 | 5V +- 10% | irrelevant | irrelevant |
| 21 | 5V +- 10% | "No fire", coded, repeated | "No fire", coded, repeated |
| 22 | 5V +- 10% | Not ("No fire", coded, repeated) | irrelevant |
| 23 | 5V +- 10% | irrelevant | Not ("No fire", coded, repeated) |
| 24 | 5V +- 10% | Not ("No fire", coded, repeated) | irrelevant |
| 25 | 5V +- 10% | irrelevant | Not ("No fire", coded, repeated) |
| 26 | 5V +- 10% | "No fire", coded, repeated | "No fire", coded, repeated |
| 27 | 5V +- 10% | Not ("No fire", coded, repeated) | irrelevant |
| 28 | 5V +- 10% | irrelevant | Not ("No fire", coded, repeated) |
| 29 | | | |
| 30 | | | |

FIG 7B

| Internal state | Failure mode | Failure rate |
|---|---|---|
| <status indication> | <description> | n.a. |
| irrelevant | no | n.a. |
| internal failure mode detected | various | 1000 |
| No internal failure detected | no | n.a. |
| No internal failure detected | Output 1 signal faulty | 100 |
| No internal failure detected | Output 2 signal faulty | 100 |
| No internal failure detected | Output 3 signal faulty | 100 |
| No internal failure detected | Common cause failure | 250 |
|  |  | 1550 |
|  |  | Sum |

| Internal state | Failure mode | Failure rate |
|---|---|---|
| <status indication> | <description> | n.a. |
| irrelevant | no | n.a. |
| internal failure mode detected | various | 1000 |
| No internal failure detected | no | n.a. |
| No internal failure detected | no | n.a. |
| No internal failure detected | no | n.a. |
| No internal failure detected | Output 1 signal faulty | 50 |
| No internal failure detected | Output 1 signal faulty | 50 |
| No internal failure detected | Output 1 signal faulty | 50 |
| No internal failure detected | Common cause failure | 25 |
| No internal failure detected | Common cause failure | 25 |
|  |  | 1200 |
|  |  | Sum |

FIG 7C

| Preventive maintenance activity | Corrective maintenance activity |
|---|---|
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |

| Preventive maintenance activity | Corrective maintenance activity |
|---|---|
| Inspect, clean, all | Exchange fuse, if not successful: exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |
| Inspect, clean, all | Exchange component |

FIG 7D

| MDT [h] with overhead | Output 1 |
|---|---|
| | <Digital signal, voltage range X> |
| 0,1 | no signal |
| 0,5 | no signal |
| 0,5 | Built from logic on inputs and internal state |
| 0,5 | Deviation from built-in logic on inputs and internal state |
| 0,5 | |
| 0,5 | |
| 0,5 | Deviation from built-in logic on inputs and internal state |

| MDT [h] | Output 1 |
|---|---|
| | <Digital signal, voltage range X> |
| 1,1 | no signal (=LOW="OPEN" OR "LEAVE OPEN") |
| 1,5 | no signal (=LOW="OPEN" OR "LEAVE OPEN") |
| 1,5 | HIGH signal (CLOSE) |
| 1,5 | no signal (=LOW="OPEN" OR "LEAVE OPEN") |
| 1,5 | no signal (=LOW="OPEN" OR "LEAVE OPEN") |
| 1,5 | HIGH signal (CLOSE) |
| 1,5 | HIGH signal (CLOSE) |
| 1,5 | no signal (=LOW="OPEN" OR "LEAVE OPEN") |
| 1,5 | HIGH signal (CLOSE) |
| 1,5 | HIGH signal (CLOSE) |

FIG 7E

| |
|---|
| Output 2 |
| <Digital signal, voltage range X> |
| no signal |
| no signal |
| Built from logic on inputs and internal state |
| |
| Deviation from built-in logic on inputs and internal state |
| |
| Deviation from built-in logic on inputs and internal state |
| |
| unused |
| Output 2 |
| <Digital signal, voltage range X> |
| irrelevant |
| irrelevant |
| irrelevant |
| irrelevant |
| irrelevant |
| irrelevant |
| irrelevant |
| irrelevant |
| irrelevant |
| irrelevant |

FIG 7F

| |
|---|
| |
| Output 3 (status) |
| <Digital signal, voltage range X> |
| no signal |
| "Interal failure CPU", coded, repeated |
| "No interal CPU failure detected", coded, repeated |
| |
| |
| Deviation from built-in logic on inputs and internal state |
| Deviation from built-in logic on inputs and internal state |
| |
| |
| |
| |
| |
| unused 2 |
| Output 3 (status) |
| <Digital signal, voltage range X> |
| irrelevant |
| irrelevant |
| irrelevant |
| irrelevant |
| irrelevant |
| irrelevant |
| irrelevant |
| irrelevant |
| irrelevant |
| irrelevant |

FIG 8

| FIG8A | FIG 8B |
|---|---|

FIG 8A

Table 5: Actuator Generic

| | Actuator, simplified (generic) | Intern | no programming capability | | |
|---|---|---|---|---|---|
| 1 | Input 1 | Internal state | Failure mode | Failure rate | Preventive maintenance activity |
| 2 | <Digital signal, voltage range X>: LOW | Output closed | no | n.a. | Inspect and test |
| 3 | <Digital signal, voltage range X>: LOW | Output open | no | n.a. | Inspect and test |
| 4 | <Digital signal, voltage range X>: HIGH | Output closed | no | n.a. | Inspect and test |
| 5 | <Digital signal, voltage range X>: HIGH | Output open | no | n.a. | Inspect and test |
| 6 | <Digital signal, voltage range X>: LOW | Output closed | Sleeping fault: unable to open | 100 | Inspect and test |
| 7 | <Digital signal, voltage range X>: LOW | Output open | Sleeping fault: unable to open | 100 | Inspect and test |
| 8 | <Digital signal, voltage range X>: HIGH | Output closed | Sleeping fault: unable to open | 100 | Inspect and test |
| 9 | <Digital signal, voltage range X>: HIGH | Output open | Sleeping fault: unable to open | 100 | Inspect and test |
| 10 | <Digital signal, voltage range X>: LOW | Output closed | Sleeping fault: unable to open | 70 | Inspect and test |
| 11 | <Digital signal, voltage range X>: LOW | Output open | Sleeping fault: unable to open | 70 | Inspect and test |
| 12 | <Digital signal, voltage range X>: HIGH | Output closed | Sleeping fault: unable to open | 70 | Inspect and test |
| 13 | <Digital signal, voltage range X>: HIGH | Output open | Sleeping fault: unable to open | 70 | Inspect and test |
| 14 | <Digital signal, voltage range X>: HIGH | Output closed | opens uncommandedly | 200 | Inspect and test |
| 15 | <Digital signal, voltage range X>: LOW | Output open | closes uncommandedly | 150 | Inspect and test |
| 16 | | | | 1030 | |
| 17 | | | | Sum | |

FIG 8B

| Inspection interval [h] | Corrective maintenance activity | MDT [h] without overhead | Output 1 | Fault detection |
|---|---|---|---|---|
| 300 | Replace defect element | 8 | Open | n.a |
| 300 | Replace defect element | 8 | Remains open | n.a |
| 300 | Replace defect element | 8 | Remains closed | n.a |
| 300 | Replace defect element | 8 | Close | n.a |
| 300 | Replace defect element | 8 | Open | no |
| 300 | Replace defect element | 8 | Remains open | no |
| 300 | Replace defect element | 8 | Remains closed | no |
| 300 | Replace defect element | 8 | Remains open | yes |
| 300 | Replace defect element | 8 | Remains closed | yes |
| 300 | Replace defect element | 8 | Remains open | no |
| 300 | Replace defect element | 8 | Remains closed | no |
| 300 | Replace defect element | 12 | Close | no |
| 300 | Replace defect element | 12 | Close | yes |
| 300 | Replace defect element | | Close | yes |

FIG 9A

| FIG 9 | FIG9A | FIG 9B |
|---|---|---|

Table 6: Actuator Instantiation

| | Actuator instantiation of type: | | | | |
|---|---|---|---|---|---|
| 22 | Actuator, simplified (generic) | Intern | | no programming capability | |
| 23 | Input 1 | Internal state | Failure mode | Failure rate | Preventive maintenance activity |
| 24 | <Digital signal, voltage range X>: LOW | Output closed | no | n.a. | Inspect and test |
| 25 | <Digital signal, voltage range X>: LOW | Output open | no | n.a. | Inspect and test |
| 26 | <Digital signal, voltage range X>: HIGH | Output closed | no | n.a. | Inspect and test |
| 27 | <Digital signal, voltage range X>: HIGH | Output open | no | n.a. | Inspect and test |
| 28 | <Digital signal, voltage range X>: LOW | Output closed | Sleeping fault: unable to close | 100 | Inspect and test |
| 29 | <Digital signal, voltage range X>: LOW | Output open | Sleeping fault: unable to close | 100 | Inspect and test |
| 30 | <Digital signal, voltage range X>: HIGH | Output closed | Sleeping fault: unable to close | 100 | Inspect and test |
| 31 | <Digital signal, voltage range X>: HIGH | Output open | Sleeping fault: unable to close | 100 | Inspect and test |
| 32 | <Digital signal, voltage range X>: LOW | Output closed | Sleeping fault: unable to open | 70 | Inspect and test |
| 33 | <Digital signal, voltage range X>: LOW | Output open | Sleeping fault: unable to open | 70 | Inspect and test |
| 34 | <Digital signal, voltage range X>: HIGH | Output closed | Sleeping fault: unable to open | 70 | Inspect and test |
| 35 | <Digital signal, voltage range X>: HIGH | Output open | Sleeping fault: unable to open | 70 | Inspect and test |
| 36 | <Digital signal, voltage range X>: HIGH | Output closed | opens uncommandedly | 200 | Inspect and test |
| 37 | <Digital signal, voltage range X>: LOW | Output open | closes uncommandedly | 150 | Inspect and test |
| 38 | | | | 1030 | |
| 39 | | | | Sum | |

FIG 9B

| Inspection interval [h] | Corrective maintenance activity | MDT [h] without overhead | Output 1 | Fault detection |
|---|---|---|---|---|
| 300 | Replace defect element | 16 | Open | n.a |
| 300 | Replace defect element | 16 | Remains open | n.a |
| 300 | Replace defect element | 16 | Remains closed | n.a |
| 300 | Replace defect element | 16 | Close | n.a |
| 300 | Replace defect element | 16 | Open | no |
| 300 | Replace defect element | 16 | Remains open | no |
| 300 | Replace defect element | 16 | Remains closed | no |
| 300 | Replace defect element | 16 | Remains open | yes |
| 300 | Replace defect element | 16 | Remains closed | yes |
| 300 | Replace defect element | 16 | Remains open | no |
| 300 | Replace defect element | 16 | Remains closed | no |
| 300 | Replace defect element | 16 | Close | no |
| 300 | Replace defect element | 20 | Open | yes |
| 300 | Replace defect element | 20 | Close | yes |

Table 7: Actuator: Relevant States Safety Criterion 1

| | Actuator instantiation of type: | Intern | | | | |
|---|---|---|---|---|---|---|
| 21 | Actuator, simplified (generic) | | no programming capability | | | |
| 22 | | Internal state | Failure mode | Failure rate | Preventive maintenance activity | |
| 23 | Input 1 | | | | | |
| 26 | <Digital signal, voltage range X>>: HIGH | Output closed | no | n.a. | Inspect and test | |
| 27 | <Digital signal, voltage range X>>: HIGH | Output open | no | n.a. | Inspect and test | |
| 32 | <Digital signal, voltage range X>>: LOW | Output closed | Sleeping fault: unable to open | 70 | Inspect and test | |
| 37 | <Digital signal, voltage range X>>: LOW | Output open | closes uncommandedly | 150 | Inspect and test | |

Table 8: CPU: Relevant States Safety Criterion 1

| | CPU (instantiation) type: | Intern | | | |
|---|---|---|---|---|---|
| 15 | CPU (generic) | | | | |
| 16 | | Input 2 | Input 3 | Internal state | Failure mode |
| 17 | Input 1 | | | | |
| 21 | 5V +- 10% | "No fire"', coded, repeated | "No fire"', coded, repeated | No internal failure detected | no |
| 24 | 5V +- 10% | Not ("No fire", coded, repeated) | irrelevant | No internal failure detected | Output 1 signal faulty |
| 25 | 5V +- 10% | irrelevant | Not ("No fire", coded, repeated) | No internal failure detected | Output 1 signal faulty |
| 27 | 5V +- 10% | Not ("No fire", coded, repeated) | irrelevant | No internal failure detected | Common cause failure |
| 28 | 5V +- 10% | irrelevant | Not ("No fire", coded, repeated) | No internal failure detected | Common cause failure |

FIG 10B

| Inspection interval [h] | Corrective maintenance activity | MDT [h] without overhead | Output 1 | Fault detection |
|---|---|---|---|---|
| 300 | Replace defect element | 16 | Remains closed | n.a |
| 300 | Replace defect element | 16 | Close | n.a |
| 300 | Replace defect element | 16 | Remains closed | yes |
| 300 | Replace defect element | 20 | Close | yes |

FIG 11B

| Failure rate | Preventive maintenance actifity | Corrective maintenance activity | MDT [h] | Output 1 | unused<br>Output 2 | unused 2<br>Output 3 (status) |
|---|---|---|---|---|---|---|
| n.a | Inspect, clean, all | Exchange component | 1,5 | HIGH signal (CLOSE) | irrelevant | irrelevant |
| 50 | Inspect, clean, all | Exchange component | 1,5 | HIGH signal (CLOSE) | irrelevant | irrelevant |
| 50 | Inspect, clean, all | Exchange component | 1,5 | HIGH signal (CLOSE) | irrelevant | irrelevant |
| 25 | Inspect, clean, all | Exchange component | 1,5 | HIGH signal (CLOSE) | irrelevant | irrelevant |
| 25 | Inspect, clean, all | Exchange component | 1,5 | HIGH signal (CLOSE) | irrelevant | irrelevant |

FIG 12

| FIG 12A | FIG 12B |
|---|---|

FIG 12A

Table 9: Fire Sensor S1: Relevant State Safety Criterion 1

| | | | | | | |
|---|---|---|---|---|---|---|
| 16 | Fire Sensor S1, type: | | | | | |
| 17 | Fire Sensor (generic) | intern | | | | |
| | Inputs | | | | | |
| 24 | IR present | 5V +- 10% | No internal failure detected | missed detection | 100 | Inspect, clean, all | Exchange component |

FIG 13

| FIG 13A | FIG 13B |
|---|---|

FIG 13A

Table 10: Actuator: Relevant States Reliability Criterion 2

| | | | | | | |
|---|---|---|---|---|---|---|
| 21 | Actuator instantiation of type: | | | | | |
| 22 | Actuator, simplified (generic) | Intern | no programming capability | | | |
| 23 | Input 1 | Internal state | Failure mode | Failure rate | Preventive maintenance activity |
| 24 | <Digital signal, voltage range X>: LOW | Output closed | no | n.a. | Inspect and test |
| 30 | <Digital signal, voltage range X>: HIGH | Output closed | opens uncommandedly | 200 | Inspect and test |

FIG 12B

| Spalte 8 |
|---|
| Outputs |
| "No fire", coded, repeated |

FIG 13B

| Inspection interval [h] | Corrective maintenance activity | MDT [h] with overhead | Output 1 | Fault detection |
|---|---|---|---|---|
| 300 | Replace defect element | 16 | Open | n.a |
| 300 | Replace defect element | 20 | Open | yes |

FIG 14

| | FIG 14A | FIG 14B | FIG 14C |
|---|---|---|---|

FIG 14A

Table 11: CPU: Relevant States Reliability Criterion 2

| 15 | CPU (instantiation) type: | | | | |
|---|---|---|---|---|---|
| 16 | CPU (generic) | Intern | | Internal state | Failure mode |
| 17 | Input 1 | Input 2 | Input 3 | <status indication> | <description> |
| 18 | <Power> | <Digital signal, voltage range X> | <Digital signal, voltage range X> | | |
| 19 | not (5V +- 10%) | irrelevant | irrelevant | irrelevant | no |
| 20 | 5V +- 10% | irrelevant | irrelevant | internal failure mode detected | various |
| 22 | 5V +- 10% | Not ("No fire", coded, repeated) | irrelevant | No internal failure detected | no |
| 23 | 5V +- 10% | irrelevant | Not ("No fire", coded, repeated) | No internal failure detected | no |
| 26 | 5V +- 10% | "No fire", coded, repeated | "No fire", coded, repeated | No internal failure detected | Output 1 signal faulty |

FIG 14B

| Failure rate | Preventive maintenance actifity | Corrective maintenance activity | MDT [h] |
|---|---|---|---|
| n.a | | | |
| n.a | Inspect, clean, all | Exchange fuse, if not successful: exchange component | 1,1 |
| 1000 | Inspect, clean, all | Exchange component | 1,5 |
| n.a | Inspect, clean, all | Exchange component | 1,5 |
| n.a | Inspect, clean, all | Exchange component | 1,5 |
| 50 | Inspect, clean, all | Exchange component | 1,5 |

FIG 14C

| Output 1 | unused<br>Output 2 | unused 2<br>Output 3 (status) |
|---|---|---|
| <Digital signal, voltage range X> | <Digital signal, voltage range X> | <Digital signal, voltage range X> |
| no signal (=LOW ="OPEN" OR "LEAVE OPEN") | irrelevant | irrelevant |
| no signal (=LOW ="OPEN" OR "LEAVE OPEN") | irrelevant | irrelevant |
| no signal (=LOW ="OPEN" OR "LEAVE OPEN") | irrelevant | irrelevant |
| no signal (=LOW ="OPEN" OR "LEAVE OPEN") | irrelevant | irrelevant |

FIG 15A

Table 12: Fire Sensor C1: Relevant States Reliability Criterion 2

| | Fire Sensor S1, type: | | | |
|---|---|---|---|---|
| 16 | Fire Sensor (generic) | intern | | |
| 17 | Inputs | | Internal state | Failure mode | Failure rate |
| 18 | Input 1 (IR signal) | Input 2 (Power Supply) | | | |
| 21 | irrelevant | 5V +- 10% | Internal failure detected | various | 500 |
| 25 | IR not present | 5V +- 10% | No internal failure detected | false alarm | 500 |
| 26 | irrelevant | 5V +- 10% | No internal failure detected | no output signal | 50 |
| 27 | irrelevant | 5V +- 10% | No internal failure detected | deviation of output signal | 150 |

| FIG 15 | FIG 15A | FIG 15B |
|---|---|---|

FIG 15B

| Preventive maintenance activity | Corrective maintenance activity | Outputs |
|---|---|---|
| | | Output 1 |
| Inspect, clean, all | Exchange component | "Internal failure fire sensor", coded, repeated |
| Inspect, clean, all | Exchange component | "Fire", coded, repeated |
| Inspect, clean, all | Exchange component | no signal |
| Inspect, clean, all | Exchange component | deviating signal (none of the above coded signals) |

FIG 16

| FIG 16A | FIG 16B |
|---|---|

FIG 16A

Table 13: Fire Sensor S1: Failure Modes For FMEA Analysis

| 16 | Fire Sensor S1, type: | intern | | | | |
|---|---|---|---|---|---|---|
| 17 | Fire Sensor (generic) | | | | | |
| | Inputs | | | | | |
| 19 | Input 1 (IR signal) | Input 2 (Power Supply) | Internal state | Failure mode | Failure rate |
| 21 | irrelevant | 5V +- 10% | Internal failure detected | various | 500 |
| 24 | IR present | 5V +- 10% | No internal failure detected | missed detection | 100 |
| 25 | IR not present | 5V +- 10% | No internal failure detected | false alarm | 500 |
| 26 | irrelevant | 5V +- 10% | No internal failure detected | no output signal | 50 |
| 27 | irrelevant | 5V +- 10% | No internal failure detected | deviation of output signal | 150 |

FIG 16B

| Preventive maintenance activity | Corrective maintenance activity | Outputs | |
|---|---|---|---|
| | | | Output 1 |
| Inspect, clean, all | Exchange component | | "Internal failure fire sensor", coded, repeated |
| Inspect, clean, all | Exchange component | | "No Fire", coded, repeated |
| Inspect, clean, all | Exchange component | | "Fire", coded, repeated |
| Inspect, clean, all | Exchange component | | no signal |
| Inspect, clean, all | Exchange component | | deviating signal (none of the above coded signals) |

FIG 17

| FIG 17A | FIG 17B |
|---------|---------|

FIG 17A

Table 14: CPU: Failure Modes For FMEA Analysis

| 14 | CPU (instantiation) type: | | | | | |
|----|---------------------------|--|--|--|--|--|
| 15 | CPU (generic) | Intern | | | | |
| 16 | Input 1 | Input 2 | Input 3 | Internal state | Failure mode | Failure rate |
| 19 | 5V +- 10% | irrelevant | irrelevant | Internal failure mode detected | various | 1000 |
| 23 | 5V +- 10% | Not ("No fire", coded, repeated) | irrelevant | No internal failure detected | Output 1 signal faulty | 50 |
| 24 | 5V +- 10% | irrelevant | Not ("No fire", coded, repeated) | No internal failure detected | Output 1 signal faulty | 50 |
| 25 | 5V +- 10% | "No fire", coded, repeated | "No fire", coded, repeated | No internal failure detected | Output 1 signal faulty | 50 |
| 26 | 5V +- 10% | Not ("No fire", coded, repeated) | irrelevant | No internal failure detected | Common cause failure | 25 |
| 27 | 5V +- 10% | irrelevant | Not ("No fire", coded, repeated) | No internal failure detected | Common cause failure | 25 |

FIG 17B

| Preventive maintenance actifity | Corrective maintenance activity | MDT [h] | Output 1 | Output 2 | unused | unused 2 | Output 3 (status) |
|---|---|---|---|---|---|---|---|
| Inspect, clean, all | Exchange component | 1,5 | no signal (=LOW="OPEN" OR "LEAVE OPEN") | irrelevant | | | irrelevant |
| Inspect, clean, all | Exchange component | 1,5 | HIGH signal (CLOSE) | irrelevant | | | irrelevant |
| Inspect, clean, all | Exchange component | 1,5 | HIGH signal (CLOSE) | irrelevant | | | irrelevant |
| Inspect, clean, all | Exchange component | 1,5 | no signal (=LOW="OPEN" OR "LEAVE OPEN") | irrelevant | | | irrelevant |
| Inspect, clean, all | Exchange component | 1,5 | HIGH signal (CLOSE) | irrelevant | | | irrelevant |
| Inspect, clean, all | Exchange component | 1,5 | HIGH signal (CLOSE) | irrelevant | | | irrelevant |

FIG 18

| FIG 18A | FIG 18B |
|---|---|

FIG 18A

Table 15: Actuator: Failure Modes For FMEA Analysis

| Actuator instantiation of type: | | | | | |
|---|---|---|---|---|---|
| 22 | Actuator, simplified (generic) | Intern | no programming capability | | |
| 23 | Input 1 | Internal state | Failure mode | Failure rate | Preventive maintenance activity |
| 28 | <Digital signal, voltage range X>: LOW | Output closed | Sleeping fault: unable to close | 100 | Inspect and test |
| 29 | <Digital signal, voltage range X>: LOW | Output open | Sleeping fault: unable to close | 100 | Inspect and test |
| 30 | <Digital signal, voltage range X>: HIGH | Output closed | Sleeping fault: unable to close | 100 | Inspect and test |
| 31 | <Digital signal, voltage range X>: HIGH | Output open | Sleeping fault: unable to open | 70 | Inspect and test |
| 32 | <Digital signal, voltage range X>: LOW | Output closed | Sleeping fault: unable to open | 70 | Inspect and test |
| 33 | <Digital signal, voltage range X>: LOW | Output open | Sleeping fault: unable to open | 70 | Inspect and test |
| 34 | <Digital signal, voltage range X>: HIGH | Output closed | Sleeping fault: unable to open | 70 | Inspect and test |
| 35 | <Digital signal, voltage range X>: HIGH | Output open | Sleeping fault: unable to open | 70 | Inspect and test |
| 36 | <Digital signal, voltage range X>: HIGH | Output closed | opens uncommandedly | 200 | Inspect and test |
| 37 | <Digital signal, voltage range X>: LOW | Output open | closes uncommandedly | 150 | Inspect and test |

FIG 18B

| Inspection interval [h] | Corrective maintenance activity | MDT [h] with overhead | Output 1 | Fault detection |
|---|---|---|---|---|
| 300 | Replace defect element | 16 | Open | no |
| 300 | Replace defect element | 16 | Remains open | no |
| 300 | Replace defect element | 16 | Remains closed | no |
| 300 | Replace defect element | 16 | Remains open | yes |
| 300 | Replace defect element | 16 | Remains closed | yes |
| 300 | Replace defect element | 16 | Remains open | no |
| 300 | Replace defect element | 16 | Close | no |
| 300 | Replace defect element | 20 | Open | yes |
| 300 | Replace defect element | 20 | Close | yes |

FIG 22

| Component | failure data (total) | design principle | Supplier / Manufacturer | other machine readable data |
|---|---|---|---|---|
| S1 | 1270 fit | infrared sensor | SensorSupplier_1 | Spatial: location X2Y1 |
| S2 (alternative 1) | 1270 fit | infrared sensor | SensorSupplier_1 | Spatial: location X2Y2 |
| S2 (alternative 2) | 2000 fit | smoke sensor | SensorSupplier_2 | Spatial: location X2Y2 |
| Cable 1 | 30 fit | cable, twisted pair | CableManufacturer_1 | Cable duct 1 |
| Cable 2 (alternative 1) | 30 fit | cable, twisted pair | CableManufacturer_1 | Cable duct 1 |
| Cable 2 (alternative 2) | 30 fit | cable, twisted pair | CableManufacturer_2 | Cable duct 2 |
| CPU | 1200 fit | single core | Processor_Manufacturer_1 | |
| other system parts | | | | |

FIG 23

| Task | role | person |
|---|---|---|
| Install S1 | assembly operator | Person_1 |
| Install S2 | assembly operator | Person_1 |
| Calibrate S1 | technician | Person_2 |
| Calibrate S2 | technician | Person_2 |
| other tasks | ... | |

FIG 24

| Common cause model check | Correlation result | | Comment |
| | Yes (malus 3%) | No (no malus 0%) | |
|---|---|---|---|
| Are redundant parts at same spatial places? | +3% | | Sensors are sufficiently spatially separated (Distance Y2-Y1. However cable 1 and cable 2 are in the same cable duct. |
| Are identical components or design principles/technologies used? | +3% | | Sensor S1 and S2 are identical devices purchased from SensorSupplier_1 and hence it is assumed that these use the same design and measuring principles. |
| Are identical lifecycle resources used? | +3% | | Both sensors are calibrated by the same technician Person_2 and hence are susceptible to human error from calibration. |
| Sum: | 9% | | |

FIG 25

| Common cause model check | Correlation result | | Comment |
|---|---|---|---|
| | Yes (malus 3%) | No (no malus 0%) | |
| Are redundant parts at same spatial places? | | +0% | Cable 1 and cable 2 are in separate cable ducts |
| Are identical components or design principles/technologies used? | | +0% | Sensor S1 and S2 use different measuring technologies. It is furthermore assumed that they use different design principles since Sensor 1 is ordered from SensorSupplier_1 while sensor S2 is ordered from SensorSupplier_2. |
| Are identical lifecycle resources used? | +3% | | Both sensors are calibrated by the same technician Person_2 and hence are still susceptible to human error from calibration. |
| Sum: | 3% | | |

METHOD FOR IDENTIFYING AND EVALUATING COMMON CAUSE FAILURES OF SYSTEM COMPONENTS

CROSS-REFERENCE TO RELATED APPLICATIONS

This application claims priority to PCT Application No. PCT/EP2019/059143, having a filing date of Apr. 10, 2019 which is based off of EP Application No. 18167633.9, having a filing date of Apr. 17, 2018, the entire contents both of which are hereby incorporated by reference.

FIELD OF TECHNOLOGY

The following relates to a method and system for identifying and evaluating common cause failures of system components of an investigated technical system of interest such as an industrial facility.

BACKGROUND

A technical system can comprise a plurality of different components, in particular hardware components connected to each other via wired or wireless links. The system can comprise several sub systems which in turn can include different kind of hardware and/or software components to be executed by hardware components. A technical system has to fulfil different kinds of criteria. A technical system has to meet predetermined safety, reliability, availability or maintainability criteria to meet a technical standard or to fulfil obligations from a contract. The increasing complexity of technical systems makes it more difficult to develop, analyse, monitor and control them. A technical system can potentially be harmful to humans or other facilities. Different kinds of safety analysis techniques can be used to assess a potential risk of an industrial system. For instance, failure modes and effects analysis FMEA can be used for failure analysis of an investigated system. FMEA involves analysis of components, assemblies and sub systems of an investigated system to identify failure modes as well as their causes and effects and to define activities such as mitigation measures etc. In a conventional failure mode and effect analysis for each component the failure modes and their resulting effects on the rest of the system can be recorded in a specific FMEA worksheet.

Conventionally, analytical artifacts, AA, such as an FMEA table documenting the outcome of an FMEA are generated manually by domain experts. Consequently, significant efforts, costs and time for experts are involved for developing and analysing complex technical systems.

Safety, reliability or availability related analytical artifacts, AA, are results when a complex technical systems has been analyzed with respect to the fulfilment of corresponding safety, reliability or availability requirements that may for instance stem from contractual obligations. The safety, reliability or availability related analytical artifacts, AA, for technical systems such as failure modes and effect analysis, fault tree or Markov chains are conventionally generated manually for instance by reliability, availability, maintainability or safety (RAMS) experts or related teams. Significant efforts, costs and time must be spent especially in case of complicated or challenging applications.

Common cause failures should be considered and evaluated in safety, reliability and availability analyses. The corresponding analytical artifacts shall reflect the effects of common cause failures.

Common cause failures are failures resulting from common causes. Common causes can comprise a wide variety of causes relating to technical, lifecycle related and/or spatial or topology aspects between different components C of a complex technical system of interest. Factors which influence common cause failures can comprise design principles, technologies, component manufacturers, component lifecycle resources, component redundancies, component diversities and even component complexities. For instance, in a factory where pressure in a fluid tank is monitored by two different pressure sensor components there can be different kinds of common cause failure influencing factors. For instance, if the two pressure sensors attached to the fluid tank are implemented by the same sensor technology or use the same measuring principle it is more likely that both sensors fail in a specific failure scenario. The same is true if both pressure sensors attached to the fluid tank are manufactured by the same component manufacturer. For instance, if the manufacturer has low standards for specific aspects of quality control it is likely that two pressure sensors manufactured by this manufacturer may both fail during specific operational conditions. Even if the sensors are manufactured by a manufacturer with high quality standards the fact that they originate from the same design and manufacturing processes does increase the probability that both pressure sensors may fail simultaneously e.g. under certain conditions or in a specific state of operation in the technical system. Another possible influencing factor for a common cause failure is that both sensors implement similar measuring techniques. This increases also the probability of a common cause failure. Another possible influencing factor for a common cause failure is the applied lifecycle procedure such as maintenance. For instance, if two sensor components attached to a fluid tank are maintained by the same maintenance team this does increase the probability that a common cause failure might occur as well e.g. because a faulty repair or calibration procedure might have been applied to both sensors. This may for instance be loose fixation screws for the sensors leading to susceptibility with respect to oscillations, i.e. both sensors could be positioned improperly or fall off simultaneously.

During planning and/or operation of an industrial facility or technical system of interest it is important to identify and evaluate common cause failures of system components in the investigated system. If sources of common cause failures are not identified this can lead to common failures of system components or sub-systems or even to a failure of the entire investigated technical system of interest.

Accordingly, an aspect relates to provide a method and system for identifying and evaluating common cause failures of system components of a system of interest.

SUMMARY

The method provides according to the first aspect of embodiments of the present invention a method for identifying and evaluating common cause failures, CCF, of system components, C, of a system, SYS, wherein at least one analytical artifact, AA, a machine readable system related spatial and/or topological data and/or machine readable system related lifecycle data are processed to analyze automatically a susceptibility of system components to common cause failure based on common cause failure influencing factors, CCFIFs.

In a possible embodiment of the method according to the first aspect of the present invention the analytical artifact, AA, comprises a machine readable safety, reliability or availability related analytical artifact generated on the basis of a machine readable functional description, mrFD, of the technical system of interest, SYS, and at least one system evaluation criterion, Sys-EC.

In a further possible embodiment of the method according to the first aspect of the present invention system components, C, of the technical system of interest, SYS, have associated machine readable functional description including port definitions and component failure mode descriptions processed to generate automatically the analytical artifact, AA, in response to at least one applied system evaluation criterion, SYS-EC.

In a possible embodiment of the method according to the first aspect of the present invention the analytical artifact comprises a fault tree, a Markov chain or a combination of fault trees and Markov chains, an FMEA (Failure Modes and Effects Analysis), an FMECA (Failure Modes, Effects and Criticality Analysis) and/or an FMEDA (Failure Modes, Effects and Diagnostic Analysis (FMEDA)).

In a further possible embodiment of the method according to the first aspect of the present invention the system related machine readable lifecycle data comprises data regarding system design, system testing, system history, system component history, training data, data regarding planned or implemented operation procedures and/or maintenance procedures concerning the system of interest.

In a still further possible embodiment of the method according to the first aspect of the present invention a quantitative common cause failure result is calculated on the basis of a machine readable common cause failure model provided for common cause failure influencing factors, CCFIFs.

In a still further possible embodiment of the method according to the first aspect of the present invention the common cause failure model comprises the IEC 61508 common cause failure model used to calculate a beta factor as a quantitative common cause failure result.

In a still further possible embodiment of the method according to the first aspect of the present invention a countermeasure is automatically triggered in response to the calculated common cause failure result.

In a still further possible embodiment of the method according to the first aspect of the present invention the machine readable spatial or topological data comprises data regarding an arrangement and/or placement of system components within the system of interest, in particular position coordinates and/or distances between system components.

In a still further possible embodiment of the method according to the first aspect of the present invention the common cause failure influencing factors related to
spatial proximity,
design principles,
technologies,
manufacturers,
lifecycle facts,
level of redundancies,
diversities within implemented redundancies, and
complexities.

In a further possible embodiment of the method according to the first aspect of the present invention the system evaluation criterion comprises
a reliability criterion,
an availability criterion, and/or
a safety criterion.

In a still further possible embodiment of the method according to the first aspect of the present invention the fault tree and/or Markov chain are provided by transforming at least one system evaluation criterion into one or more corresponding relevant state patterns at ports forming a system boundary of the system of interest, SYS, and by
generating the fault tree and/or Markov chain on the basis of the relevant state patterns and on the basis of the failure modes of the components of the system of interest.

In a still further possible embodiment of the method according to the first aspect of the present invention the analytical artifact, AA, is provided by
transforming at least one system evaluation criterion, SYS-EC, into one or more corresponding relevant state patterns at ports of the system boundary and/or at ports inside of the system of interest and by
generating the analytical artifact, AA, on the basis of the relevant state patterns and on the basis of the component failure modes descriptions of the components of the system of interest.

In a still further possible embodiment of the method according to the first aspect of the present invention the method further comprises
transforming the system evaluation criterion, SYS-EC, into at least one system state that can be represented by a state pattern,
applying at least one state pattern to input ports and output ports of the system boundary of the system of interest,
deriving relevant system failure events by automatically using the failure propagation mechanisms based on the machine readable functional descriptions, mrFD, of the system components including their failure mode descriptions, and
assembling the derived failure events to generate the fault tree and/or Markov chain used as an analytical artifact, AA.

In a still further possible embodiment of the method according to the first aspect of the present invention the machine readable functional description, mrFD, of a system component comprises
port definitions of input and output ports of the system component,
component failure modes,
an internal state or states of the component,
a failure rate,
a maintenance activity,
an inspection interval,
a mean down time, and/or
a mean time to repair.

In a still further possible embodiment of the method according to the first aspect of the present invention the system components of the system of interest comprise
hardware components, software components to be executed by hardware components such as CPUs, and embedded components.

Embodiments of the invention provide according to the second aspect a system for identification and evaluation of common cause failures of a technical system of interest comprising system components, said identification and evaluation system comprising
a database which stores a digital twin of the system of interest including machine readable system related spatial and/or topological data and/or machine readable system related lifecycle data and
a processing unit adapted to process at least one analytical artifact, AA, and the machine readable system related spatial and/or topological data and/or machine readable system related lifecycle data to analyze automatically a susceptibility of system components of said system of interest to common cause failure based on common cause influencing factors, CCFIFs.

In a possible embodiment of the system according to the second aspect of the present invention the processing unit comprises at least one processor adapted to calculate a qualitative or quantitative common cause failure result, CCFR, on the basis of a machine readable common cause failure model, CCFMOD, provided for common cause failure influencing factors, CCFIFs.

In a further possible embodiment of the system according to the second aspect of the present invention the processing unit comprises a user interface, UI, adapted to output the calculated common cause failure result and/or a control interface adapted to output a control signal in response to the calculated common cause failure result, CCFR.

In a still further possible embodiment of the system according to the second aspect of the present invention an analytical artifact, AA, is generated automatically by a processing unit on the basis of machine readable functional descriptions, mrFD, of system components stored in the database in response to at least one applied system evaluation criterion, SYS-EC.

BRIEF DESCRIPTION

Some of the embodiments will be described in detail, with reference to the following figures, wherein like designations denote like members, wherein:

FIG. 4 shows a table for illustrating the operation of the method and system according to the present invention for a specific exemplary technical system according to FIG. 2 to be investigated;

FIG. 5 shows the functional description for the power supply for the CPU component C3 in the generic and instantiated and modified form;

FIG. 6 shows a functional description for the fire sensor components C1, C2 of the investigated system both in generic and instantiated form;

FIG. 6a shows a functional description for the fire sensor components C1, C2 of the investigated system both in generic and instantiated form;

FIG. 6b shows a functional description for the fire sensor components C1, C2 of the investigated system both in generic and instantiated form;

FIG. 6c shows a functional description for the fire sensor components C1, C2 of the investigated system both in generic and instantiated form;

FIG. 7 shows a functional description of the CPU component C3 in generic and instantiated and modified form;

FIG. 7a shows a functional description of the CPU component C3 in generic and instantiated and modified form;

FIG. 7b shows a functional description of the CPU component C3 in generic and instantiated and modified form;

FIG. 7c shows a functional description of the CPU component C3 in generic and instantiated and modified form;

FIG. 7d shows a functional description of the CPU component C3 in generic and instantiated and modified form;

FIG. 7e shows a functional description of the CPU component C3 in generic and instantiated and modified form;

FIG. 7f shows a functional description of the CPU component C3 in generic and instantiated and modified form;

FIG. 8 shows the functional description of the actuator component C4 in generic form FIG. 8a shows the functional description of the actuator component C4 in generic form;

FIG. 8b shows the functional description of the actuator component C4 in generic form;

FIG. 9 shows the functional description of the actuator component C4 in instantiated form;

FIG. 9a shows the functional description of the actuator component C4 in instantiated form;

FIG. 9b shows the functional description of the actuator component C4 in instantiated form;

FIG. 10 shows the relevant states for an exemplary system failure criterion;

FIG. 10a shows the relevant states for an exemplary system failure criterion;

FIG. 10b shows the relevant states for an exemplary system failure criterion;

FIG. 11 shows the relevant states for the CPU component C3 for a potential violation of the above exemplary system safety criterion 1;

FIG. 11a shows the relevant states for the CPU component C3 for a potential violation of the above exemplary system safety criterion 1 . . . ;

FIG. 11b shows the relevant states for the CPU component C3 for a potential violation of the above exemplary system safety criterion 1;

FIG. 12 shows relevant states of the fire sensor component C1 for the above given exemplary system safety criterion 1;

FIG. 12a shows relevant states of the fire sensor component C1 for the above given exemplary system safety criterion 1;

FIG. 12b shows relevant states of the fire sensor component C1 for the above given exemplary system safety criterion 1;

FIG. 13 shows the relevant states of the actuator component C4 of the system SYS for a potential violation of the reliability criterion stated above;

FIG. 13a shows the relevant states of the actuator component C4 of the system SYS for a potential violation of the reliability criterion stated above;

FIG. 13b shows the relevant states of the actuator component C4 of the system SYS for a potential violation of the reliability criterion stated above;

FIG. 14 shows the relevant states of the CPU component C3 for the reliability criterion stated above;

FIG. 14a shows the relevant states of the CPU component C3 for the reliability criterion stated above;

FIG. 14b shows the relevant states of the CPU component C3 for the reliability criterion stated above;

FIG. 14c shows the relevant states of the CPU component C3 for the reliability criterion stated above;

FIG. 15 shows the relevant states of fire sensor component C1 for a potential violation of the above stated reliability criterion 2;

FIG. 15a shows the relevant states of fire sensor component C1 for a potential violation of the above stated reliability criterion 2;

FIG. 15b shows the relevant states of fire sensor component C1 for a potential violation of the above stated reliability criterion 2;

FIG. 16 shows the failure modes of fire sensor component C1 for FMEA Analysis;

FIG. 16a shows the failure modes of fire sensor component C1 for FMEA Analysis;

FIG. 16b shows the failure modes of fire sensor component C1 for FMEA Analysis;

FIG. 17 shows the failure modes of the CPU component C3 for FMEA analysis;

FIG. 17a shows the failure modes of the CPU component C3 for FMEA analysis;

FIG. 17b shows the failure modes of the CPU component C3 for FMEA analysis . . . ;

FIG. 18 shows the failure modes of the actuator component C4 of the system for FMEA analysis;

FIG. 18a shows the failure modes of the actuator component C4 of the system for FMEA analysis;

FIG. 18b shows the failure modes of the actuator component C4 of the system for FMEA analysis;

FIG. 22 shows a table illustrating the operation of the method and system according to the present invention for a specific exemplary technical system to be investigated;

FIG. 23 shows a table illustrating the operation of the method and system according to the present invention for a specific exemplary technical system to be investigated FIG. 24 shows a table illustrating the operation of the method and system according to the present invention for a specific exemplary technical system to be investigated; and FIG. 25 shows a table illustrating the operation of the method and system according to the present invention for a specific exemplary technical system to be investigated.

DETAILED DESCRIPTION

Figure 1:
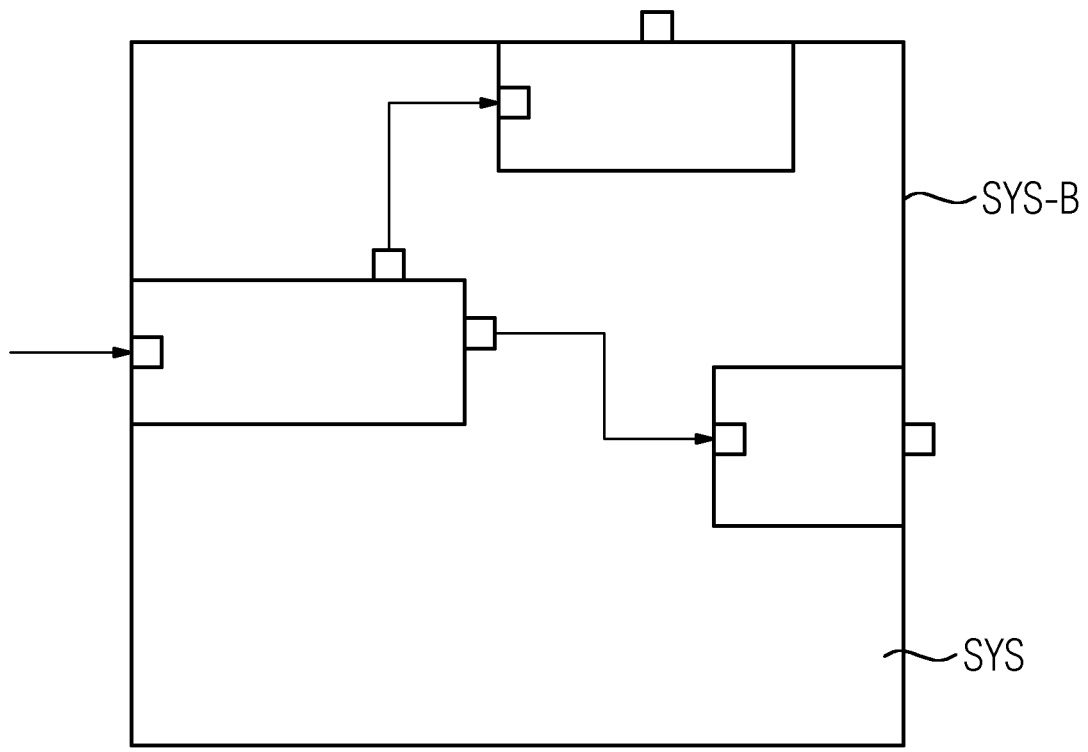
FIG. 1 shows an exemplary technical system of interest which can be defined and investigated by the method and system according to the present invention.

As can be seen in the diagram illustrated in FIG. 1 an investigated technical system SYS can comprise several components C. The components C can comprise subcomponents such as switches, sensors or actuators, software components to be executed by hardware components such as CPUs and embedded components comprising both hardware and embedded software to run the respective hardware component. Each component C can comprise input ports and output ports for connecting the respective component with other components of the defined and investigated system. In the illustrated exemplary system of FIG. 1 the system comprises three components C1, C2, C3. The system SYS comprises a system boundary SYS-B which comprises the interface ports of the system to other systems. In the illustrated example of FIG. 1 the first component C1 comprises an input port to receive a signal and two output ports which are connected to other components C2, C3 of the investigated system SYS. The second component C2 comprises a single input port connected to the first output port of the first component C1. The second component C2 comprises a single output port which forms an external port or interface at the system boundary SYS-B of the system. The third component C3 also comprises a single input port and a single output port. The single input port of the component C3 is connected internally to the second output port of the first component C1 as shown in FIG. 1. The output port of the third component C3 forms an external port or interface at the system boundary SYS-B of the investigated system SYS. As can be seen in FIG. 1 the system boundary SYS-B comprises in the illustrated embodiment three ports, i.e. the input port of the first component C1, the output port of the second component C2 and the output port of the third component C3. The components C within the system SYS can comprise different kinds of components C including hardware components, software components to be executed by hardware components such as CPUs and embedded components. The hardware components can comprise all analogue or digital components. The components C, C2, C3 each have an associated machine readable functional description including the port definitions as well as component failure mode descriptions which are processed to generate automatically an analytical artifact used for development and/or analysis of the investigated technical system of interest SYS in response to at least one applied system evaluation criterion. These analytical artifacts comprise in a possible embodiment a fault tree, a Markov chain, a combination of fault tree(s) and Markov chain(s), an FMEA table, or an FMECA table, an FMEDA table. These analytical artifacts are generated automatically on the basis of a full functional description of the system of interest SYS including a machine-readable description of the failure modes of its components or sub systems. Further, the analytical artifacts can be generated for different kinds of evaluation criteria such as for instance safety, reliability, maintainability and/or availability criteria.

The different components C such as components C1, C2, C3 of the system SYS illustrated in FIG. 1 can be supplied by different suppliers which offer their technical components or sub systems with a standardized generic functional description which is machine readable. It is also possible to use a semiformal functional description with OMG SysML or AADL or EAST-ADL. The functional description does include input and output port definitions and additional information data about failure modes, their causes and corresponding failure properties, in particular failure rates, preventive and corrective maintenance activities and test-related data. In a possible embodiment each component C comprises an associated functional description. This functional description of the component C can comprise the port definitions of the input and output ports of the respective component C, all component failure modes of the component, at least one internal state of the respective component, a failure rate, maintenance activities, an inspection interval and/or a mean down time (MDT) and/or a mean time to repair (MTTR) of the component.

The different vendors or suppliers providing components C for the complex technical system SYS can in future use a standardized common generic functional description of the respective component C which can be stored in a memory. In a possible embodiment the machine-readable functional description of the respective component C within the system SYS of interest can be stored in a local memory of the component C. The local memory can be integrated within the component. In a possible embodiment the functional description can be read from the memory by a reader. In a still further possible embodiment the functional description for a component can be output via ports of the system SYS in response to a specific request applied to the respective component or even applied to the system SYS. In a specific implementation the system boundary SYS-B may comprise a specific pin or port used to read out a functional description from different components C of the investigated system SYS. In an alternative implementation the functional description can also be read out from a local memory output by the component using internal connections and an output port of a component of the system SYS such as the output port of the second or third components C2, C3 illustrated in the example of FIG. 1. For instance, the functional description of components C1, C2 can be read from the output port of component C2 and the functional description of components C1, C3 can be read from the output port of component C3.

The functional descriptions extracted from the system SYS of interest can be supplied to a processor or processing unit of an investigating system which can be used for analysing, monitoring and/or even controlling the technical system SYS of interest or a larger system that may comprise the technical system SYS using at least one automatically generated analytical artifact. This analytical artifact can be generated from the associated machine-readable functional descriptions of the different components C within the investigated system SYS. In an alternative embodiment machine readable functional description of a component C within the system SYS of interest can also be stored in a cloud, in a remote data storage or database. Each component C of the investigated system SYS comprises an associated machine-readable functional description. The different machine-readable functional descriptions of all components C forming part of the investigated system SYS can be evaluated or processed by a processing unit to generate automatically at least one analytical artifact for at least one applied system evaluation criterion. This analytical artifact can be used for developing and/or analysing and/or controlling the investigated technical system SYS or a larger system that may comprise the system SYS. In the illustrated example of FIG. 1 the overall system description also includes the connection from the first output port of the first component C1 to the input port of component C2 as well as the connection from the second output port of component C1 to the input port of component C3. It is also possible to embed the overall functional description into the corresponding system environment and take into account the relevant operational conditions of the system. In an embodiment a composition of components or sub systems to the overall investigated system SYS can be conducted automatically. The generic functional description of the component or sub system can reflect standardized implementation concepts or architectural patterns, e.g. with respect to sensor circuit, signalling or communication protocols which facilitates the system development. The relevant component functionality of the system component can be selected and enriched using architectural patterns if needed in the course of the system definition and system development. It is possible that application classes for programmable or configurable components are predefined for selection from a repository.

In a possible embodiment system-specific information data can be added. This may for instance relate to a fact that an uncontained fire leads to a very long mean down time MDT of the investigated system since the whole system has to be rebuilt. Critical combinations of the events can also be specified with corresponding mean down times MDT in order to assist a complex safety, reliability or availability analysis. A more comprehensive description of the component or sub system however may already include these kinds of dependencies in the functional description of the respective components.

The automatically generated analytical artifact can be used for a safety analysis, a reliability analysis, an availability analysis, a maintainability analysis or further evaluations of the system. Accordingly, the investigated system can be investigated to check whether the system fulfils certain system evaluation criteria. These system evaluation criteria can comprise reliability criteria, availability criteria, maintainability criteria, safety criteria or further evaluation criteria. In a possible embodiment the system evaluation criterion can be derived automatically from a technical safety standard or contractual obligations stored in a database. Further, the system evaluation criteria can be derived in a possible embodiment automatically from a machine readable contract. For example, a safety criterion may be based on a national or international standard and a reliability criterion, a maintainability criterion or an availability criterion can be based on specific contractual obligations that can be transformed and translated into at least one state pattern. The corresponding state patterns have to be applied to relevant input ports and/or output ports of the investigated system. With these assignments it is possible to derive relevant failure events by following the method described below. The derived relevant failure events are then assembled to the required safety, reliability or availability related analytical artifact, as for instance a fault tree model. The imminent failure propagation has to be respected in order to identify the relevant failure events and to assemble the corresponding fault tree. The procedure can be conducted automatically by resorting to the overall functional system or solution description or to a subset of it depending on the evaluation criterion. The generated analytical artifact can comprise in a possible embodiment a fault tree or a Markov chain. A fault tree is generated automatically on the basis of the machine readable functional descriptions of all components C forming part of the investigated system SYS. These functional descriptions include port definitions and component failure modes of the different components. A failure mode relates to a specific manner or way of which a failure occurs. A failure mode can describe a failure state of the respective item (or function) under consideration. A failure mode is the result of a failure mechanism. The components' or sub systems' failure modes can contribute directly or according to a more sophisticated logic to failure events on system level. This may involve logic combinations with other components C or sub systems of the investigated system SYS according to a specifically implemented evaluation logic.

In a possible embodiment the functional description of each component C includes data about failure modes, FM, as well as about preventive and/or corrective maintenance activities and even test-related data on component or sub system level. This information can be aggregated in order to establish maintenance related artifacts such as required resources, required tooling, training requirements or corresponding plans. Preventive and/or corrective maintenance activities can specify tools, skills, training requirements or repair time etc. In order to determine a relevant down time it is required to respect specific circumstances of the operational concept such as additional logistical overhead etc.

Data with respect to the failure modes can also indicate if and how those failure modes can be detected. This data can be used for generation of test cases.

With respect to a safety analysis of the investigated system SYS relevant safety functions can explicitly be defined with their functional dependencies in course of the system development.

The standardized nature of most safety criteria can be exploited to prepare an ontology to be used for the system design in order to match the corresponding terms or at least in order to facilitate associated mapping processes between the functional description of the system and the corresponding state pattern. In case that the safety, reliability, availability or maintainability related analytical artifacts do not meet predetermined quantitative target values it may be required to further detail the functional description or even to modify the system architecture or the operational concept and to repeat the analysis thereafter until the required target values are reached.

Figure 2:
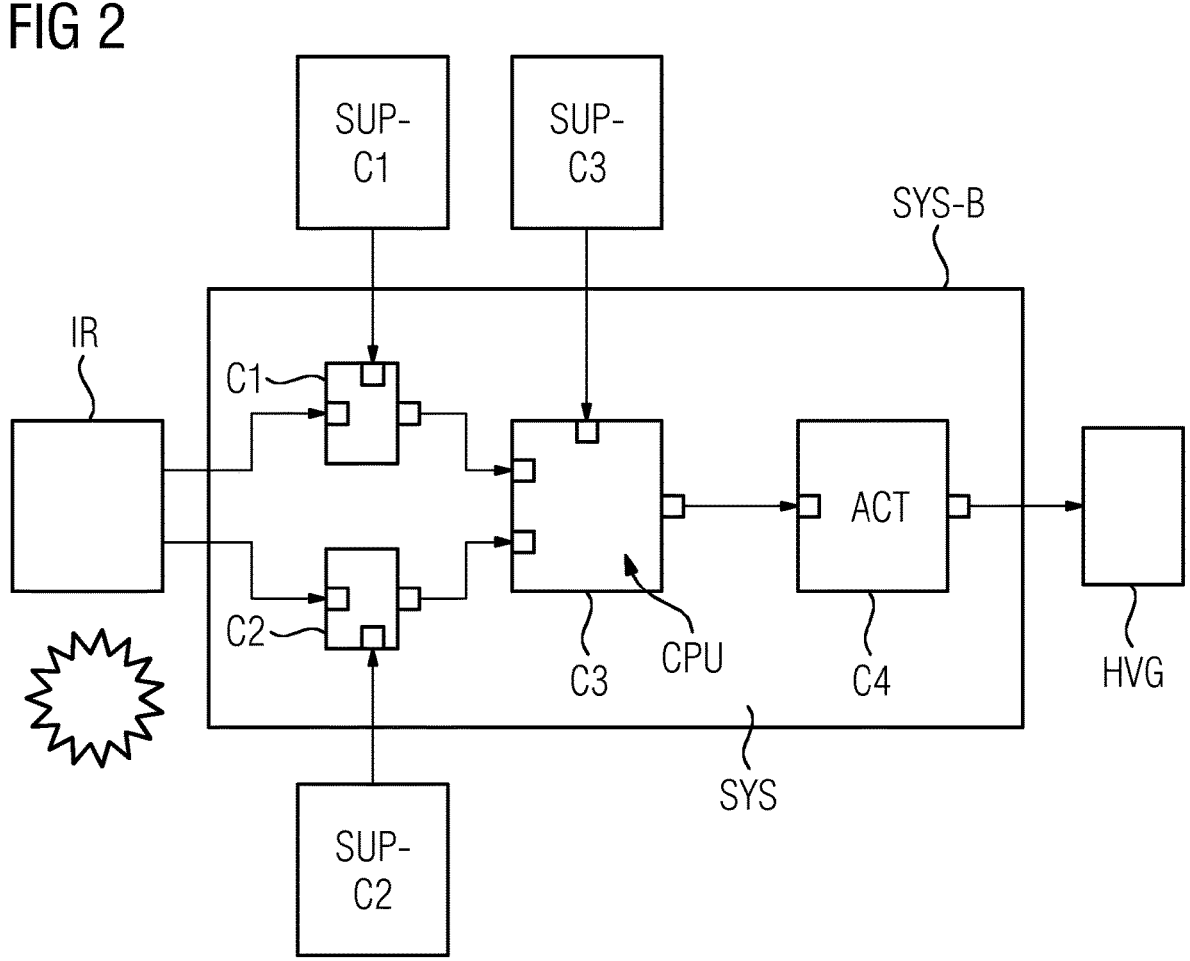
FIG. 2 shows a further exemplary technical system which can be defined and investigated by a method and system according to the present invention.

FIG. 2 shows a diagram for illustrating a possible exemplary embodiment of a system SYS of interest to be investigated. The illustrated system of FIG. 2 comprises a system to detect fire and to disconnect a target system from a high voltage power supply grid. The target system can comprise one or several power consumption entities and can be disconnected from the high voltage power supply grid by an actuator component C4 of the investigated technical system SYS. The investigated system SYS comprises in the illustrated embodiment four different components C1, C2, C3, C4. The investigated system consists of two infrared sensors C1, C2, a CPU component C3 and an actuator component C4. The actuator component C4 is capable of opening and closing a connection to an external high voltage power supply grid HVG. This is a measure established in order to contain or to support the extinction of fire.

A potential source of infrared radiation IR which may be caused by fire shows statistical behaviour. In the illustrated example the input ports of the infrared sensor components C1, C2 are facing the potential IR source (fire). In the illustrated figure of FIG. 2 the arrows indicate if the respective port forms an input port or an output port.

Both sensor components C1, C2 are dedicated to sense the infrared radiation source and to transmit a message "fire" or "no fire" to the connected CPU controller C3. Each sensor Cl, C2 can have implemented the functionality to detect internal sensor failures and to transmit the signal "internal failure fire sensor" in these cases. For instance, both components C1, C2 receive a supply voltage from external power supply sources SUP-C1, SUP-C2 as illustrated in FIG. 2. Further, the CPU component C3 also receives an external power supply source SUP-C3 outside the system boundary SYS-B of the investigated system SYS.

A logic can be implemented in the CPU component C3 as follows. A "HIGH" output level toward the actuator component C4 is only activated in case that both fire detector components C1, C2 transmit a "no fire" signal to the CPU component C3. In other cases the output level at the output port of the CPU component C3 is set to "LOW". Both sensor components C1, C2 as well as the CPU component C3 require dedicated power supplies to function as intended. Lacking power supply leads to "no signal" at the output port of the fire detector components C1, C2 or to a "LOW" signal at the CPU output port of component C3 respectively.

The detection system SYS as illustrated in FIG. 2 has to meet different kinds of predefined evaluation criteria. For example, a possible safety criterion might be that the high voltage grid HVG has to be switched off by the actuator C4 if fire is detected. The system failure criterion can be transformed in a possible embodiment into one or more corresponding relevant state patterns at the ports forming the system boundary SYS-B of the investigated system SYS. The states at the different ports of the system boundary SYS-B comprise failure criterion fulfilling states and failure criterion not fulfilling states. In a possible embodiment the state pattern can be binary, i.e. high/low.

The potential IR source representing the fire can be represented by a state "1" (high) applied to the input ports of the sensor components C1, C2. If the investigated system SYS operates correctly, the output port of the actuator component C4 has a state "0" (low). Accordingly, a binary state pattern at these three ports "1-1-0" indicates a correct operation of the system with respect to the system function described above. The safety criterion in this case is not fulfilled in the former case. A state pattern such as "1-1-1" indicating that the investigating system does not switch off the high voltage grid HVG although both sensor components C1, C2 face an IR source indicates that the safety failure criterion is fulfilled and that the safety function "switch off the high voltage grid HVG by the actuator C4 if fire is detected" of the system SYS has failed. The states of all other ports of system SYS are arbitrary with respect to the evaluation criterion chosen above i.e. all states of these ports have to be considered. For reasons of simplicity these ports are not depicted here in the corresponding pattern representation. In order to express that all states of a certain port matter one can for instance choose a representation "X" for the corresponding port in order to express that e.g. in case of binary patterns both states "1" and "0" apply.

Different kind of state patterns can be generated for different system evaluation criteria including safety criteria, reliability criteria, availability criteria and maintainability criteria. In a possible embodiment at least one system evaluation criterion is automatically transformed into one or more corresponding relevant state patterns at the ports forming the system boundary SYS-B and/or at internal system ports of the investigated system SYS. In a further step a fault tree and/or Markov chain can be generated on the basis of the relevant state patterns and on the basis of the component failure modes of the components C forming part of the investigated system SYS. In the illustrated example of FIG. 2 a fault tree can be generated on the basis of relevant state patterns derived from at least one system failure criterion and on the basis of the component failure modes of the components C1, C2, C3, C4 specified in the associated machine readable functional descriptions of the respective components C1 to C4.

Figure 3:
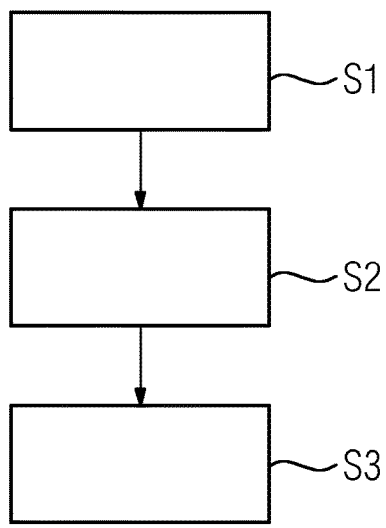
FIG. 3 shows a flowchart of a possible exemplary embodiment of a method for providing an analytical artifact which can be used by a method for identifying and evaluating common cause failures of system components according to an aspect of the present invention.

As illustrated in the flowchart of FIG. 3 the automatic generation of an analytical artifact, AA, such as a fault tree FT can be performed in different main steps.

In a first step S1 the respective system evaluation criterion is transformed into at least one state definition which may for instance, be presented in the form of a binary state pattern. The corresponding evaluation or failure criterion for system SYS can demand that the system is or remains connected to the high voltage power supply grid in case of a fire. In a specific embodiment the system evaluation criterion can be a text-based system evaluation criterion which is transformed automatically by a linguistic transformation program into a corresponding relevant state pattern such as a binary or multi-level state pattern.

In a further step S2 the generated state pattern and hence the evaluation criterion is applied to input ports and output ports at the system boundary SYS-B of the system SYS or to internal ports of the system of interest. This may comprise that both fire detector components C1 and C2 are exposed to infrared radiation (IR) due to fire and that the actuator component C4 is or remains in the state "closed" or "connected to the high voltage power supply grid (HVG)".

In a further step S3 all combinations of events that satisfy the input and output ports state pattern and hence the evaluation criterion are derived by automatically taking into account the failure propagation mechanisms and assembled to generate the fault tree which forms an analytical artifact that can be used for development and/or analysis of the investigated technical system. The combination of events that satisfy the evaluation criterion is based on the component failure modes and the functional dependencies of the system SYS.

The generated analytical artifact, AA, can be used by the method according to embodiments of the present invention to identify and evaluate common cause failures, CCFs, of system components of an investigated system. The analytical artifact, AA, can also be provided by an external source in a machine-readable format.

The following tables illustrate examples for functional descriptions of the components C of the investigated system as illustrated in FIG. 2. To demonstrate the process of both the generic version as it may be delivered by a component supplier or vendor as well as the instantiated version including required modifications, i.e. the implemented version of the component within the system SYS are depicted in the tables if "instantiation" is indicated. It is the lower of the presented tables with the exception of the actuator table where for reasons of required space the tables are split on two separate pages.

The failure rates and mean down times MDTs within the tables are fictitious and are only used for demonstration purposes. Further, every function and for every failure mode corresponding preventive and/or corrective maintenance activities are indicated. By knowing the relevant operational concept it is assumed that the corresponding mean down times MTDs can be calculated from the data of the functional descriptions including port definitions and component failure mode descriptions, e.g. by adding an appropriate overhead for travel, access or setup. The mean down times MDT for the instantiated components C are a function of the generic values and can be implemented in the operational concept.

Table 1 illustrated in FIG. 4 shows a functional description of the power supply component for the fire sensors C1, C2. Table 1 shows the functional description of the generic components and the functional description of the instantiated and modified power supply component. The functional description of the instantiated and modified component emerges from adapting the generic functional description with respect to the specific requirements of the system in interest.

Table 2 illustrated in FIG. 5 shows the functional description for the power supply for the CPU component C3 in the generic and instantiated and modified form.

Table 3 illustrated in FIG. 6A, 6B, 6C shows a functional description for the fire sensor components C1, C2 of the investigated system both in generic and instantiated form.

Table 4 illustrated in FIG. 7A to 7F shows a functional description of the CPU component C3 in generic and instantiated and modified form. The instantiated and modified functional description accounts for the specific requirements of the system to be built. This entails the relevant logic to be implemented on the CPU.

Further, table 5 in FIG. 8A, 8B illustrates the functional description of the actuator component C4 in generic form.

Further, table 6 of FIG. 9A, 9B illustrates the functional description of the actuator component C4 in instantiated form.

Failure modes connected to the rows with the indication "no" with respect to "fault detection" can be omitted or filtered since for the corresponding operation request the dormant or sleeping fault is irrelevant.

In a further possible embodiment, one may choose to omit the corresponding lines from the functional description.

For demonstrating the operation of a method according to embodiments of the present invention two different exemplary evaluation criteria may be applied to the investigated system SYS as illustrated in FIG. 2.

For example, the following system safety criterion 1 can be applied: "In case of fire the system shall be disconnected from the high voltage power supply grid with a tolerable hazard rate of THR_Fire_1."

The definition above implies a present fire. This fire entails an infrared radiation at the system boundary SYS-B of the investigated system SYS at the input ports of the fire sensor components C1, C2 shown in FIG. 2. Therefore, it is possible to exclude the corresponding states at the input ports of the fire sensor components that refer to "IR not present".

The system output side is represented by the output port of the actuator component C4. Only in case of a closed connection between the output port of the actuator component C4 towards the high voltage power supply grid HVG a violation of the specified safety criterion is possible. In a possible implementation by means of a filter function one gets the potential failure states or events as indicated in following table 7 by excluding all states referring to an open output connection and by excluding sleeping failure modes that are irrelevant to the corresponding switching request and hence cannot be detected in course of this operation.

Table 7 shown in FIG. 10A, 10B illustrates the relevant states for an exemplary system failure criterion.

One can identify two failure modes of the actuator from table 7 that contribute to the event according to a potential violation of the exemplary safety criterion which can be referred to as a safety function failure. With respect to failure propagation it is additionally possible that functions that constitute output to the actuator's input also contribute to system failures according to the safety criterion 1. However as can be seen from table 7 above this is only possible in case a "HIGH" level is applied to the input port of actuator component C4. The input port of the actuator component C4 is elected and corresponds to the output port of the CPU component C3 as illustrated in FIG. 2. Consequently the CPU's table can be filtered accordingly.

Table 8 shown in FIG. 11A, 11B illustrates the relevant states for the CPU component C3 for a potential violation of the above exemplary system safety criterion 1.

On the basis of the functional description of table 8 it is possible to identify four additional failure modes of the CPU component C3 that can contribute to the safety failure criterion. Moreover, functions delivering input to the CPU component C3 can also contribute to failures on a system level by means of failure propagation. This however is only possible as long as the input ports of the CPU component C3 are connected to the fire sensing components C1, C2 both receive the signal "no fire" and the CPU power supply works.

By taking into account the fact that a fire and hence infrared radiation must be present in order to be relevant for the above given exemplary safety criterion 1 gets table 9 for the fire sensor component C1.

Table 9 shown in FIG. 12A, 12B illustrates relevant states of the fire sensor component C1 for the above given exemplary system safety criterion 1. The same applies to fire sensor component C2.

From the above analysis it can be derived that only one failure mode as depicted in table 9 contributes to the safety criterion on sensor level. This failure mode is only relevant in case both sensor components erroneously transmit the "no fire" signal to the CPU component C3 due to "missed detection". The evaluation logic ensures that only if both sensor components transmit the "no fire" signal to the CPU component C3 a contribution to the analytical artifact according to a potential violation of safety criterion 1 is possible.

The analytical artifact representing a fault tree for a safety function can now be written as below. The OR[. . . , . . . ]-operator represents an OR gate of the elements listed in between its brackets. This OR[. . . , . . . ]-operator can also be applied to just one element. The corresponding table and its lines for the relevant failure mode are indicated in parenthesis.

Fault Tree
(System "Fire Detection And Disconnection From The Grid", Application of "Safety Criterion 1")
TOPEVENT(Safety Criterion 1)=
(Fire sensor S1:OR[24] AND Fire sensor S2:OR[24]) OR
CPU:OR[24, 25, 27, 28] OR
Actuator:OR[32, 37]

The numbers in the brackets illustrate rows within the above tables corresponding to failure modes of the respective components.

A fault tree is generated automatically for the TOPEVENT corresponding to a potential violation of the system safety criterion 1.

A quantitative fault tree evaluation that may be executed by means of commercial fault tree calculation software will yield a result that has to be compared with the safety criterion 1 in order to finally determine whether the safety criterion has been achieved or failed. The same applies to the fault trees below.

The compilation represents a conservative approximation. This means that the effects of failure modes are entirely propagated to the system output even though other failure events on this way could diminish their influence. The method disclosed in this patent application can be used to calculate the results precisely by taking into account those failure modes that prevent the investigated system to show a malfunction according to the definition of a certain criterion. It is possible to calculate the effects of combined failure modes where one failure mode prohibits another failure mode to propagate. Consequently, a more general description is the following generated fault tree:

Fault Tree
(System "Fire Detection And Disconnection From The Grid", Application Of "Safety Criterion 1", detailed)
TOPEVENT(Safety Criterion 1)=
(Fire sensor S1:OR[24]) AND (Fire sensor S2:OR[24]) ANDNOT(CPU:OR[19,20,26]) OR
(CPU:OR[24,25,27,28] ANDNOT(Actuator:OR[31,36])) OR
Actuator: OR[32,37]

Please note that the events "Fire sensor S1:OR[20]", "Fire sensor S2:OR[20]" as well as "CPU:OR[18] "correspond to events that are outside of the relevant system boundary SYS-B. In many cases these external events can be considered as being ideal, i.e. without any failure mode. Nevertheless, the method according to embodiments of the present invention allows to respect the influence in case that corresponding probabilistic data is given or can be estimated.

By means of the method according to embodiments of the present invention the relevant failure modes can be selected and composed according to a relevant state pattern. With respect to computing the corresponding results one has to take into account the nature of the failure modes, i.e. dormant or sleeping failures have to be calculated by taking into account their test or operational interval and hence their so-called time at risk (TAR).

For illustrating the operation of the method according to embodiments of the present invention a second exemplary evaluation criterion with respect to reliability may be applied to the system.

The corresponding reliability criterion 2 is given as follows:

"The mean number of unintended disconnections from the high voltage power supply grid per year caused by the system shall not exceed NUD(number of unintended disconnections)_PerCalendarYear_1"

Note that this definition of the criterion only focuses on disconnections that are caused without a fire being present since a disconnection due to fire is intended. Moreover being unable to reconnect to the high voltage power supply grid HVG (e.g. due to a dormant fault) is excluded by definition of the reliability criterion.

Table 10 of FIG. 13A, 13B shows the relevant states of the actuator component C4 of the system SYS for a potential violation of the reliability criterion stated above.

Hence the actuator component C4 contributes to the relevant events only with its failure mode "opens uncommandedly". All other failure modes can be excluded with respect to this reliability criterion.

Moreover it can be derived from the list of dataset above that only a "LOW" signal level that is equivalent to "no signal" at the input port of the actuator C4 needs to be regarded with respect to a potential failure propagation. Since the input port of the actuator C4 corresponds to the output port of the CPU component C3 the CPU list can be filtered accordingly.

Table 11 shown in FIG. 14A, 14B, 14C below illustrates the relevant states of the CPU component C3 for the reliability criterion stated above.

Failure modes of the CPU component C3 that have to be reflected in this reliability related analytical artifact are the ones in lines 20 and 26. Lines 19, 22 and 23 in table 11 represent potentially propagated failure modes of functions connected to the input port of the CPU component.

According to FIG. 2 the power supply of the CPU component C3 is located outside the relevant system boundary SYS-B. Consequently faults caused by the CPU power supply component (or function) SUP-C3 do not relate to the reliability criterion 2 and shall not be attributed to the investigated system SYS as indicated in line 19 of table 11 and hence can be left out for generating the corresponding analytical artifact.

Contrary to this the events indicated in lines 22, 23 of table 11 represent output states of the fire sensor components C1, C2. Those are located inside the relevant system boundary and hence belong to the investigated system SYS as illustrated in FIG. 2.

It can be derived that the relevant input signal on the input ports respectively must be NOT "no fire" which means that all other signal apart from the "no fire" signal must be regarded. The power supplies SUP-C2, SUP-C2 for the sensor components C1, C2 are both located outside the relevant system boundary SYS-B. Hence their contributions can be ignored with respect to the reliability related analytical artifact. The remaining failure events caused by sensor component C1 are depicted in Table 12.

Table 12 shown in FIG. 15A, 15B illustrates the relevant states of fire sensor component C1 for a potential violation of the above stated reliability criterion 2.

A situation with an infrared signal IR being present at input port of sensor component C1 must be excluded since this corresponds to a normal intended sensor operation and does not constitute an unintended disconnection from the high voltage power supply grid HVG. The same holds for fire sensor component C2.

Please note that all remaining failure modes of the list of both sensor components do contribute to the analytical artifact since the implemented CPU logic outputs a "LOW" level at its output port in case that any of the transmitted fire sensor signals deviates from the "no fire" signal.

The analytical artifact formed by a fault tree can now be written as below. The corresponding table and its lines for the relevant failure modes are indicated in parenthesis.

Fault Tree
(System "Fire Detection And Disconnection From The Grid", Application Of "Reliability Criterion 2")
TOPEVENT(Reliability Criterion 2)=
Fire sensor S1:OR[21,25,26,27]OR Fire sensor S2:OR[21,25,26,27]OR
CPU:OR[20,26]OR
Actuator:OR[36]

A quantitative fault tree evaluation by means of e.g. a commercial fault tree calculation software will enable to determine if the reliability criterion 2 has been met or failed.

The method according to embodiments of the present invention can also be used to support the generation of FMEA artifacts or its derivatives such as Failure Modes and Effects and Criticality Analysis (FMECA) or a Failure Modes, Effects and Diagnostic Analysis (FMEDA).

On the basis of generated or manually elaborated FMEA artifacts it is also possible to generate, elaborate or detail relevant functional descriptions. For FMEA analysis and corresponding derivatives single faults or failures can be investigated while the remaining system is supposed to function perfectly.

The aspect of "occurrence" can be addressed by means of a failure rate or the probability of a certain failure mode. Specific environmental conditions may be involved such as for instance temperature, load, switching rate etc.

The aspect of "detectability" can be addressed by corresponding control functionality of the system, by operations disclosing certain failure states, by self-testing or by means of preventive maintenance measures including for instance inspections or testing procedures in order to discover dormant faults within the system.

Further, the aspect of "severity" can be addressed by means of functional dependencies. However its significance can be defined application-specific. A certain classification can be prepared in advance and then applied to the different output results.

It is possible that a supplier of a component may add a description of the failure causes for the failure modes of the components or sub systems delivered to the system manufacturer. This allows a more focused procedure during system development, e.g. by means of adding dedicated sensor circuits or enforcing quality measures to detect failures earlier and more reliably.

For the elaborated example a severity classification is used. It may be assumed that an unwanted disconnection from the high voltage power supply grid HVG be rated with a number of e.g. "5" while a fire event that does not lead to a disconnection from the high voltage power grid is rated with a number "9" due to its potential devastating nature and its long reinstatement time. Moreover, it can be supposed that a detected fire can be fought quickly and hence be kept well contained. All other failures may be rated with a value "2".

The FMEA severity classification described above corresponds to certain system states or state patterns. Those state patterns can be used to classify the severity on system failures in an automated way.

The failure modes of fire sensor component C1 are displayed in table 13 shown in FIG. 16A, 16B. Table 13 illustrates the failure modes of fire sensor component C1 for FMEA Analysis.

The logic implemented in the CPU component C3 can evaluate the fire sensor component output signals and can initiate a disconnection from the high voltage power supply grid HVG if the signal of fire sensor component C1 deviates from "no fire". Hence all events illustrated in table 13 with the exception of line 24 can be rated with a number "5" directly because they lead to a disconnection from the power supply grid HVG. In case of line 24 of table 13 an infrared source (such as a fire) must be present. With the assumption of only a single failure being present in the entire system SYS it can be concluded that fire sensor component C2 works, detects the infrared source and transmits the fire signal to the CPU component C3. The CPU component C3 in turn can command a disconnection from the high voltage power grid HVG which results in a value "5" rating again. Consequently, all single faults of the fire sensor component C1 lead to a number "5" rating. The same applies to fire sensor component C2.

Failure modes of the CPU component C3 of the system SYS are displayed in table 14. Table 14 shown in FIG. 17A, 17B illustrates the failure modes of the CPU component C3 for FMEA analysis.

The failure modes indicated in lines 19 and 25 of table 14 lead to a number "5" rating. The events indicated in all other lines of the table lead to a number "9" rating since an infrared source must be present. This is the case because the fire sensors must transmit the "fire" signal due to the single failure assumption as indicated before and hence also a fire must be present.

Failure modes of the actuator component C4 are indicated in table 15. Table 15 shown in FIG. 18A, 18B illustrates the failure modes of the actuator component C4 of the system for FMEA analysis.

The dormant or sleeping faults according to the lines 28, 29, 30, 33, 34, 35 of table 15 cannot be detected. Here a normal operation is given despite a failure being present. According to the severity classification described above those failure modes receive a number "2" rating.

The failure mode according to line 32 of table 15 is rated with value "9" because the disconnection from the high voltage power grid HVG is not conducted in case of a present fire ("LOW" level at input represents a fire in case of single faults analysis).

The same holds for failure modes according to line 37 of table 15 since a connection to the power supply grid HVG is reestablished with a fire being present i.e. the actuator component C4 receives a "LOW" signal which stands for a present fire under the assumption of single system faults.

The failure mode with respect to line 31 of table 15 represents a rating of "2" since the actuator component C4 simply remains open.

The failure mode FM according to line 36 of table 15 has to be rated with a value "5" event since it is an uncommanded disconnection from the high voltage power grid HVG. For reasons of simplicity failures of the power supplies for the fire sensor components C1, C2 or of the power supply for the CPU component C3 have not been investigated since they form elements outside the relevant system boundary SYS-B.

It is possible to enrich the functional descriptions of the components C with performance the prosattributes such as for instance corresponding time durations. For example maximum durations can be defined. For the exemplary system as illustrated in FIG. 2 the following maximum durations might be given:

Fire sensor components C1 and C2: detection of infrared source and transmitting a signal: 150 ms CPU component C3: processing input signals and commanding output signal: 50 ms Actuator component C4: disconnection from the high voltage power supply grid: 100 ms A further modified safety criterion can be formulated as follows:

"In case of fire the system shall be disconnected from the high voltage power supply grid with a tolerable hazard rate of THF_Fire_1 within one second".

The maximum duration of the coupled functions amounts to 300 ms (150+50+100 ms) which is shorter than one second. As a consequence, the above safety criterion can be met by the system of interest. If the relevant safety criterion indicated a reaction time below 300 ms it would be required to perform amendments on component level or to alter the architecture of the investigated system in order to achieve a shorter overall reaction time which fits to the requirement of the modified safety criterion. In case a remaining time budget as indicated above for safety criterion is provided it is possible to optimize the investigated system. One solution can be that the CPU component C3 evaluates the received fire signals for a longer period of time before commanding a disconnection signal to the actuator component C4. This will reduce the number of false alarms by resorting to mean values.

In a possible embodiment the generated analytical artifact, AA, can comprise a Markov chain. This analytical artifact, AA, can be required in case that the sequence of events is relevant and a more detailed modeling is required to achieve certain target values. Accordingly, it can be possible to implement a Markov chain logic for the modeling of a safety, reliability or availability related artifact. In this embodiment additional knowledge on system level can be introduced. This can be for instance the fact that the mean down time MDT of the investigated system SYS in case of an undetected fire is significantly longer than those of all other failure states. Corresponding critical sequences can be specified. The Markov chain approach is far-reaching since every fault tree can be described by a Markov chain of first order.

The method for providing an analytical artifact, AA, can be formed by a corresponding program or tool to generate one or several analytical artifacts. With the method according to embodiments of the present invention it is possible to generate one or more analytical artifacts faster. Moreover, the generated analytical artifacts AA are more precise and have a higher level of consistency. The analytical artifacts AA can be generated with less effort. The analytical artifacts can be generated by means of any kind of evaluation criterion e.g. a safety, a reliability, an availability or a maintainability criterion. Failure modes can prevent other failure modes from causing failures on system level and can also be recognized in order to receive more precise results of the respective analytical artifacts.

After system definition and selection of the relevant system port states according to the applied evaluation criterion manual steps are no longer required to derive or to generate automatically the analytical artifacts. The method and system can also be applied to dynamic systems of interest. For certain applications the process of selection of the relevant system states may be supported or partly or even totally be conducted automatically.

The complex investigated systems SYS can comprise any kind of technical systems such as production plants, factories, facilities, power distribution systems, vehicles etc. Consequently, there is a huge variety of different use cases for the method according to embodiments of the present invention. In a possible embodiment the generated analytical artifact AA can be stored for further processing in a memory or database. The generated analytical artifact can be stored in a repository for further use. Moreover, the generated analytical artifact AA can also be processed to monitor and/or control automatically components of the system SYS of interest, the entire system or a system that comprises the system depending on an evaluation result of the processed analytical artifact. Accordingly, embodiments of the invention further provide a system for analyzing, monitoring and/or controlling any kind of technical system of interest SYS which can comprise a plurality of different components. The different components C of the investigated system SYS have ports which are connected to each other via wired or wireless links and comprise associated machine-readable functional descriptions which may be stored in a local or remote memory. The associated machine-readable functional descriptions mrFD comprise port definitions and failure modes (FM) descriptions which are processed by a processor to generate automatically at least one analytical artifact AA. The generated analytical artifact AA can in turn be processed to analyze, monitor and/or control the system of interest. The analytical artifact AA can also be read from a database or repository.

In a possible embodiment the analytical artifact AA can be generated in the development phase of an investigated system SYS consisting of components C or subsystems connected to each other according to a stored system model of the developed system. This data model of the investigated system can be stored in a database of the development system. Further, a prototype of the investigated system can be analyzed using analytical artifacts AA. Further, a technical system can also be monitored or even controlled by processing analytical artifacts AA. When exchanging components C within a system SYS the corresponding analytical artifacts AA generated for the respective system can be adapted or reconfigured automatically for the new system. Calculation and generation of the analytical artifacts can be performed in a possible embodiment during operation of the investigated system even in real time. The manufactures of the different components C within the system SYS can provide the associated functional descriptions of the respective component C in a possible embodiment online via internet to the analytical system used for analyzing the respective system of interest. The machine-readable functional description of the respective component can be integrated within local memory of the manufactured component C and can be read out by a processing unit of the analytical system analyzing the investigated system including the respective components.

Figure 19:
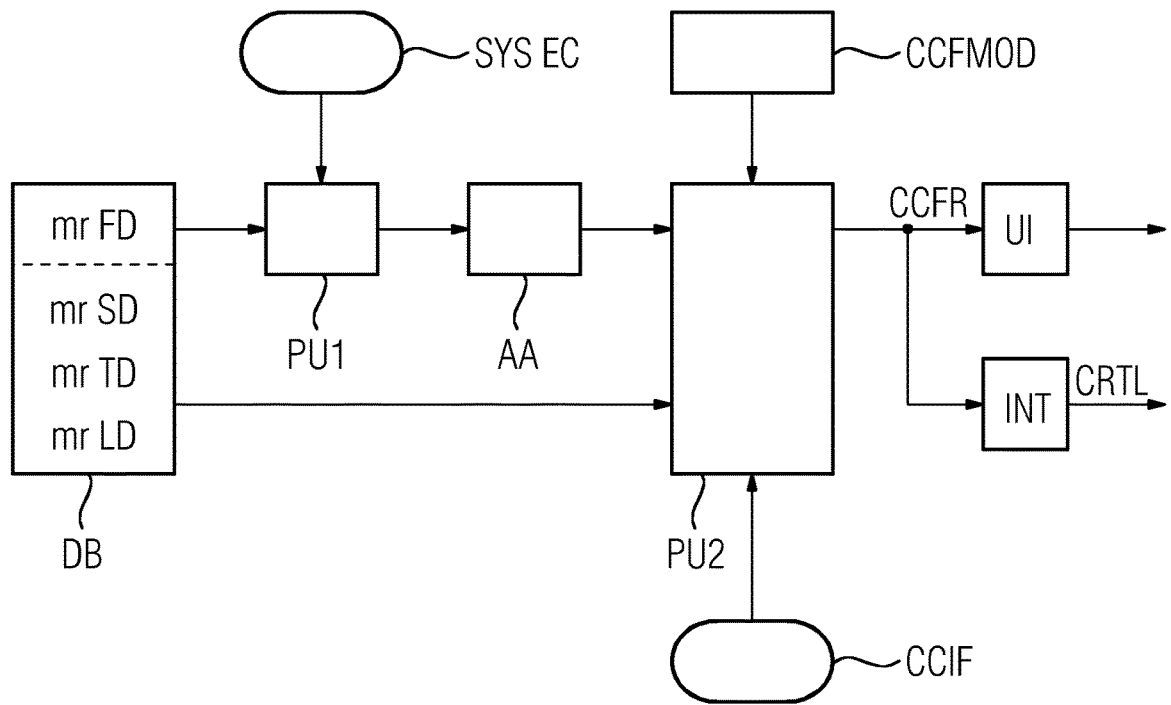
FIG. 19 shows a block diagram for illustrating a possible exemplary embodiment of a system for identification and evaluation of common cause failures, CCFs, of a technical system of interest according to an aspect of the present invention.

FIG. 19 shows an exemplary embodiment of a system for identification and evaluation of common cause failures CCF of a technical system of interest SYS comprised of subsystems and system components C. The identification and evaluation system according to embodiments of the present invention comprises in the illustrated embodiment a database DB which stores a digital twin of the system of interest. The digital twin of the system of interest does include machine readable system related spatial (mrSD) and/or topological data (mrTD) and/or machine-readable system related lifecycle data (mrLD). The machine readable spatial or topological data can comprise in a possible embodiment data regarding an arrangement and/or placement of system components C of the system of interest. For example, machine readable spatial or topological data can comprise position coordinates and/or distances between systems components of the investigated system. The spatial or topological data can comprise data about system or plant site decomposition, in particular location or segments of systems, subsystems and/or system components. The investigated system can be any kind of technical or industrial system consisting of sub-systems and hardware and/or software components. The system of interest can comprise hardware components, software components to be executed by hardware components such as CPUs as well as embedded components. The database DB further stores machine readable system related lifecycle data mrLD. Machine readable lifecycle data can comprise for instance data regarding system design, system testing, system history, system component history, training data, data regarding planned or implemented operation procedures and/or maintenance procedures concerning the respective system of interest.

The digital twin of the system of interest can also comprise in a possible embodiment machine readable functional data mrFD as illustrated in the block diagram of FIG. 19. On the basis of the machine readable functional data mrFD forming a functional description of the technical system of interest, a first processing unit PU1 can generate a machine readable safety, reliability or availability related analytical artifact AA in response to at least one system evaluation criterion SYS-EC as shown in FIG. 19. The generated analytical artifact AA can comprise in a possible embodiment a fault tree, Markov chain and/or a combination of fault trees and Markov chains. The generated analytical artifact AA can be stored temporarily in a memory for further processing as illustrated in FIG. 19. The machine-readable functional description mrFD can comprise in a possible embodiment port definitions and component failure mode descriptions processed by the first processing unit PU1 to generate automatically the analytical artifact AA in response to the at least one applied system evaluation criterion. The system evaluation criterion SYS-EC can comprise for instance a reliability criterion, an availability criterion and/or a safety criterion. In a possible embodiment the first processing unit PU1 generates automatically a fault tree FT and/or a Markov chain. In a possible embodiment the first processing unit PU1 transforms at least one system evaluation criterion into one or more corresponding relevant state patterns at ports forming a system boundary of the system of interest SYS and then generates the fault tree and/or Markov chain on the basis of the relevant state patterns and on the basis of the component failure modes of the components of the investigated system of interest. In a possible embodiment the system evaluation criterion SYS-EC is transformed into at least one system state that can be represented by a state pattern. Then at least one state pattern is applied to input ports and output ports of the system boundary of the system of interest. Further, relevant system failure events are derived by automatically taking into account or using failure propagation mechanism based on the machine readable functional description mrFD of the system components including their failure mode descriptions. Finally, the derived failure events are assembled by the first processing unit PU1 to generate the fault tree and/or Markov chain used as an analytical artifact AA which is stored temporarily in a memory for further processing. The machine readable functional description mrFD of the system components used by the first processing unit PU1 to generate automatically the analytical artifact AA can comprise for instance port definitions of input and output ports of the component, failure modes, internal states of the components, failure rates, maintenance activities, inspection intervals, mean down times and/or mean times to repair.

As illustrated in the block diagram of FIG. 19 the second processing unit PU2 of the identifying and evaluation system has access to the generated analytical artifact AA and has further access to the machine readable spatial data, the machine readable topological data and the machine readable lifecycle data of the investigated system stored in the database DB. The processing unit PU2 comprises at least one processor adapted to process the analytical artifact AA and the machine readable system related spatial and/or topological data and/or machine readable system related lifecycle data to analyze automatically a susceptibility of system components of the investigated system SYS to common cause failure influencing factors CCFIF. Common cause failure influencing factors can comprise design principles, technologies, manufacturers, lifecycle resources or facts, level of redundancy, diversities within implemented redundancies as well as complexities. The processing unit PU2 can calculate in a possible embodiment a quantitative common cause failure result CCFR on the basis of a machine-readable common cause failure model CCFMOD provided for the common cause failure influencing factors CCFIFs. The machine-readable common cause failure model CCFMOD can also be stored in a memory or database as illustrated in FIG. 19. In a possible embodiment the common cause failure model can comprise the IEC 61508 common cause failure model which can be used by the processing unit PU2 to calculate a beta factor as a quantitative common cause failure result CCFR. The processing unit PU2 and the processing unit PU1 can be integrated in one processing unit.

In a possible embodiment one or more countermeasures can be automatically triggered in response to the calculated common cause failure result CCFR output by the processing unit PU2. The processing unit PU2 can comprise in a possible embodiment a user interface UI used to output the calculated common cause failure result CCFR and/or the analytical artifact including the common cause failure result CCFR to a user. The processing unit PU2 can also comprise a data interface adapted to output a control signal CRTL in response to the calculated common cause failure result CCFR, e.g. by using the analytical artifact including the common cause failure result CCFR. This control signal can be applied to a local or remote-control unit to trigger countermeasures in response to the calculated common cause failure result CCFR or in response to the analytical artifact including the common cause failure result CCFR. Different countermeasures can be ranked or listed according to their effectiveness. The countermeasure can be a technical measure such as switching from one sub-system to another sub-system or segregating certain components, e.g. using different cable ducts, or an organizational measure such as additional training or deployment of different maintenance teams to certain areas of an industrial plant. Common cause failure results CCFRs can be calculated in a possible embodiment during a planning stage of the investigated system. In a further embodiment the common cause failure result CCFR can be calculated during operation of the investigated system. In this embodiment the generated control signal can change an operation mode of the investigated industrial system in response to the calculated quantitative common cause failure result CCFR. For instance, if the probability for common cause failures becomes too high or if the calculation of the analytical artifact (e.g. a fault tree) including common cause failures yields a too high failure probability a corresponding countermeasure can be automatically triggered by the system illustrated in FIG. 19. The system enables common cause failure evaluations with respect to any kind of safety, reliability or availability related analytical artifacts generated for an investigated technical system and automated procedures. With the method and system according to embodiments of the present invention it is possible to generate more comprehensive, more precise, more consistent and more reliable results by automated processing of data and analytical artifacts. The calculation of the quantitative common cause failure result CCFR can be performed fast to trigger fitting countermeasures with regard to common cause failures CCFs within the investigated system.

The processing unit PU2 can be connected to a user interface UI adapted to list and rank suggested countermeasures in response to the calculated common cause failure result. The processing unit is adapted to evaluate different countermeasures and to define a countermeasure or sets of countermeasures that will be satisfactory to meet at least one predefined system evaluation criterion if this criterion can be met by a reduction of common cause failure effects.

The user interface can be used to evaluate different countermeasures and to implement a countermeasure or sets of countermeasures in the design, in the lifecycle and/or in the operational model that will be satisfactory to meet at least one predefined system evaluation criterion if this criterion can be met by a reduction of common cause failure effects.

The processing unit can be adapted to evaluate different countermeasures by taking into account additional criteria available in the machine readable data such as costs, efforts etc. to derive an optimal countermeasure or optimal sets of countermeasures in the design, in the lifecycle and/or in the operational model that will be satisfactory to meet at least one predefined system evaluation criterion if this criterion can be met by a reduction of common cause failure effects.

The system suppliers or components suppliers can offer their technical components or sub-systems with a standardized description, i.e. the so called digital twin. This standardized description can comprise a semiformal functional description such as SysML including functional and/or relevant spatial information. The description can include input and output port definitions as well as additional information about failure modes, their causes and corresponding failure properties such as for instance failure rates or preventive and corrective maintenance activities. These generic descriptions are stored in the database DB and are available to the first processing unit PU1 and the second processing unit PU2.

Figure 20:
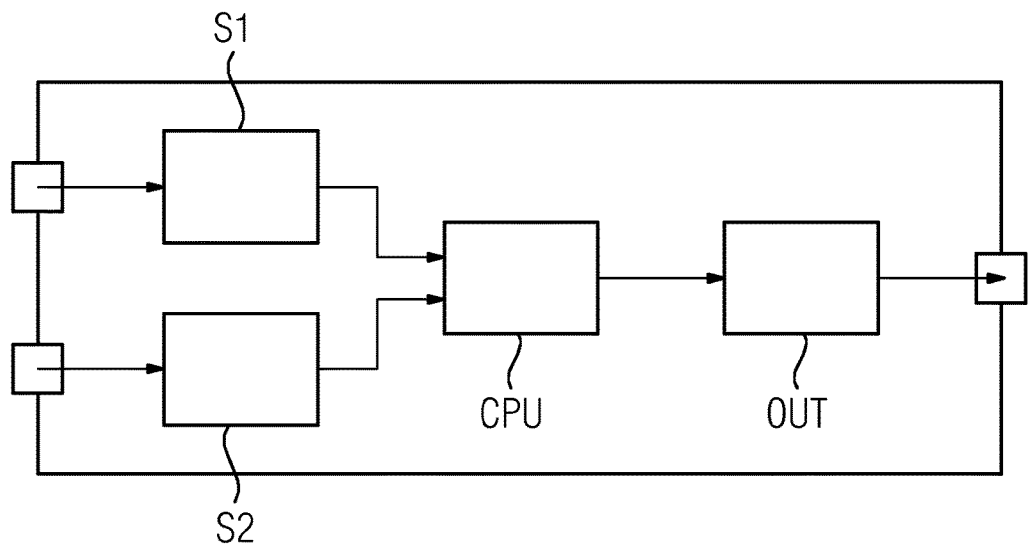
FIG. 20 shows a block diagram of an exemplary system of interest to illustrate the operation of the method and system according to the present invention.

In the following the method and system according to embodiments of the present invention are described in more detail with respect to the exemplary investigated system illustrated in FIG. 20. The investigated system SYS can provide an overall functionality to disconnect itself from an external high voltage HV power grid in case of fire as illustrated in FIG. 20. In the illustrated example the investigated system comprises one infrared sensor S1 as a first system component and a second sensor S2 as a second system component. In the illustrated example the second sensor S2 can be implemented in a first alternative similar to the first infrared sensor S1 and in a second alternative 2 by using a different measuring principle or technology, e.g. as a smoke sensor or smoke detector. The illustrated investigated system SYS of FIG. 20 further comprises a central processing unit CPU and an actuator which is supposed to be capable of opening and closing a connection to the external high voltage power grid. This is a measure established in order to contain or extinct a fire. Other measures may also be useful, but they do not form part of the example illustrated in FIG. 20. Note that FIG. 20 illustrates a simplified model since a more complex activation circuit may be required in order to control a circuit breaker. In addition, a combination of a circuit breaker and a disconnector can be implemented usually in order to be sure of avoiding unintended reconnections of the power supply grid. Moreover, reconnecting of the grid normally requires an additional allowance signal i.e. by a main control system. This does avoid a reconnection during fire extinction or cleaning-up activities. Nevertheless, for demonstration purposes the simplified system of FIG. 20 is used. The outer box as illustrated in FIG. 20 does identify a system boundary of the investigated system SYS. The direction of the arrows does indicate whether a port forms an input port or an output port. All sensors S1, S2 illustrated in FIG. 20 are dedicated to detecting a fire and to transmit a message "fire" or "no fire" to the connected controller (CPU). In a possible embodiment the logic implemented in the controller is as follows. A "HIGH" output level towards the actuator is only activated in case that both fire detectors do transmit the "no fire" signal to the CPU. In other cases, the output level shall be set to "LOW". In the example shown in FIG. 20 it is furthermore assumed that both sensors S1, S2 as well as the CPU of the investigated system require dedicated power supplies to function as intended. Lacking power supply shall lead to "no signal" at the output of the fire detectors or to a "LOW" signal at the CPU output, respectively.

To perform the method for identifying and evaluating common cause failures system components of an investigated system as illustrated in FIG. 20 the second processing unit PU2 has access to an analytical artifact AA representing the investigated system derived from machine readable functional description mrFD of the investigated system SYS. The analytical artifact AA derived from the machine readable functional data mrFD of the investigated system SYS can comprise a fault tree.

Formula 1

(Fire sensor S1:OR[24]) AND (Fire sensor S2:OR
  [24]) OR CPU:OR[24, 25, 27, 28] OR Actuator:
  OR[32,37]"

In the above formula 1 there is only one "AND" gate and no "M-out-of-N" gate with M greater than 1. As a consequence, fire sensors S1 and S2 of the investigated system form candidates for a common cause evaluation which will be carried out subsequently.

Figure 21:
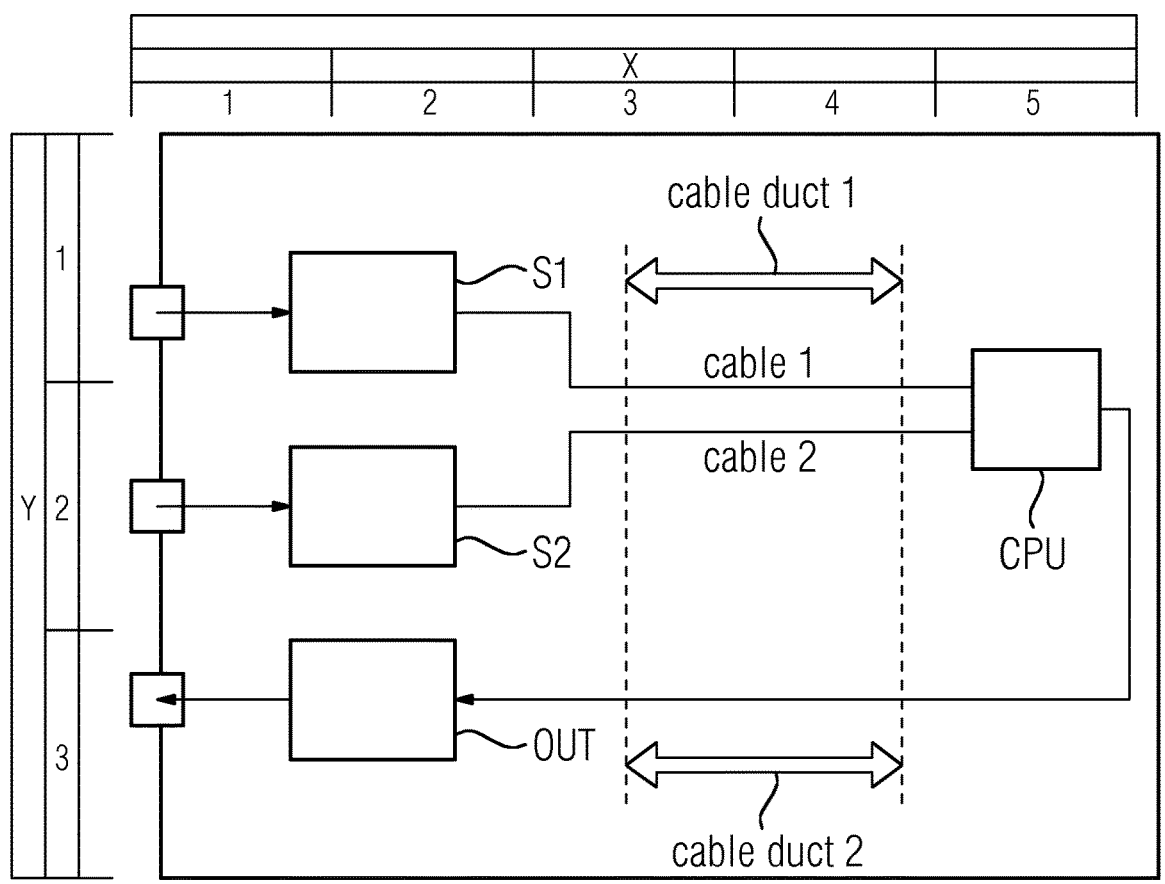
FIG. 21 shows a schematic diagram for illustrating machine readable topological data and/or machine readable spatial data which can be used by the method and system according to the present invention to calculate a susceptibility of the system components to common cause failure influencing factors.

Topologically the HGV power station according to FIG. 21 can be separated into a peripheral section and a central control room. The distance within the cable ducts may reach for instance 500 m in typical plants. This information or data can form part of the topological and/or spatial machine-readable data of the digital twin stored in the database DB of the evaluation system. Examples for other technical domains such as semiconductors might contain wiring distances of only a few micrometers.

FIG. 21 illustrates the topological, spatial data for the first alternative by using a top down view as well as X and Y coordinates with every increment representing 100 m.

In the illustrated example (alternative 1) it can be assumed that both fire sensors S1, S2 are detectors for infrared radiation and that both cables are put in the same cable duct 1 and that subsequently potential disturbing influences on the cables 1 and 2 may lower the reliability of fire detection.

As can be seen from FIG. 21 sensor S1 and sensor S2 are physically separated with a distance of around 100 m.

In order to demonstrate the effects of different common cause failure influencing factors, CCFIFs, on the fire detection system an evaluation of the cable connections between sensors S1 and sensors S2 and the CPU as illustrated in FIG. 21 is included.

The machine-readable data can contain technical information about the components of the investigated system. For sake of simplicity only a total failure rate is indicated in the table illustrated in FIG. 22. FIG. 22 does depict a simplified example. FIG. 22 shows reliability data as well as design or logistic information data. For each component of the investigated system failure data, design principle, supplier or manufacturer as well as other machine-readable data is stored in the table shown in FIG. 22. For instance, the first sensor S1 has a total failure of 1270 fit and is formed by an infrared sensor. Sensor S1 is manufactured by SensorSupplier_1, and has the spatial location within system X2Y1 as shown in FIG. 21.

For the second sensor S2 two alternatives are included in the table of FIG. 22. In the first alternative the second sensor S1 is an infrared sensor whereas in the second alternative the second sensor S2 is a smoke sensor. Further, both sensors S1, S2 according to the second alternative are manufactured by two different sensor suppliers. Actually, the second sensor S2 is placed at the same location within the system for both alternatives as also indicated in the table of FIG. 22. The first cable 1 is extending through cable duct 1. The second cable 2 is extending in the first alternative through the same cable duct 1. In the second alternative the cable 2 is extending through another cable duct 2 separate from cable duct 1 where cable 1 is located.

Development, manufacturing, installation and commissioning, operation, maintenance and so on form lifecycle phases of each component in the investigated system. FIG. 23 shows an example for lifecycle data LD which can be used by the method and system according to embodiments of the present invention. Each lifecycle step or phase is conducted by a certain amount of resources in terms of persons in the required roles, methods to be applied, tools etc. Lifecycle steps determine the quality and hence dependability of system components or functions. If system components comprise similar lifecycle data LD for particular steps these components may suffer the same weaknesses that may potentially lead to common cause failures CCFs. For the example given here it is assumed that both fire sensors S1, S2 need calibration after their installation. When an error occurs during calibration the effect of redundancy on reliability might be reduced and hence the probability of a common cause failure might be increased.

In a possible embodiment for calculating a susceptibility of system components to common cause failure influencing factors a common cause failure model can be used by the second processing unit PU2 as illustrated also in FIG. 19. In a possible implementation the common cause failure model CCFMOD can be a complex common cause failure model such as the IEC 61508 common cause failure model used to calculate a beta factor as a quantitative common failure cause result CCFR.

FIG. 24 shows a machine-readable common cause failure model of the investigated system illustrated in FIG. 21 for the first alternative i.e. where the second sensor S2 is formed by an infrared sensor and hence both sensors S1, S2 are identical. In the exemplary system according to alternative 1 the common cause failure model CCFMOD processed by the processing unit PU2 yields for the applied common cause failure influencing factor CCFIFs a common cause failure result CCFR i.e. a factor Gamma=9%. This means that it can be assumed that 9% of the corresponding faults may lead to a system failure due to common cause failures despite the implemented redundant element or sensor. This can also be seen from Formula 2 (Alternative 1) as below:

Formula 2-Alternative 1

((Fire sensor S1:OR[24] OR Cable 1) AND ((Fire sensor S2:OR[24]) OR Cable 2) OR ((Fire sensor S2:OR[24] OR Cable 1) AND Gamma=9%) OR CPU:OR[24, 25, 27, 28] OR Actuator:OR [32, 37]", It is of note that for simplification purposes a conservative estimation has been made in the given example, i.e. Gamma=9% is applied to the entire fire detection sensor despite the fact that the sensors are physically separated with only the cables being located in the same cable duct.

Based on a knowledge database of past industry best practice and the stored digital twin, suggestions can be generated for a system designer or analyst to mitigate or eliminate common cause failure influencing factors. Alternatively, an implementation of alternatives can be suggested or the alternatives can be even implemented automatically. The most suitable alternative depending on the safety, reliability or availability target and potentially further criteria (such as cost, availability of parts or resources, time constraints etc.) can be evaluated for a final implementation of the system. In case of the exemplary system illustrated in FIG. 21 the method and system according to embodiments of the present invention can suggest the responsible user the following countermeasures:

put cable 2 in a second cable duct (e.g. in cable duct 2 together with the cable to component OUT), check whether a second sensor based on a different measuring principle can be used and/or dispatch a different technician to calibrate sensor S2.

As a consequence of the suggestions generated automatically by the evaluation system according to embodiments of the present invention the following changes or countermeasures can be assumed to be implemented in the investigated technical system:

cable 2 is put into another cable duct (cable duct 2) and is hence separated from cable 1 and/or for sensor S2 a smoke detector is chosen which implements a measuring principle different from infrared radiation. In addition, this smoke detector can be produced by a different manufacturer. In the given example the failure rate of the smoke sensor is supposed to be 2000 fit which is slightly higher than the failure rate of an infrared sensor.

it may be assumed in the exemplary system that a second technician may not be available for sensor calibration. In this case the corresponding suggestion generated by the evaluation system according to embodiments of the present invention may not be implemented.

FIG. 25 shows a table for a machine-readable common cause failure model mrCCFMOD for the second alternative where the second sensor S2 is implemented as a smoke sensor. As a result of the mitigation or elimination of common cause factors the common cause failure result CCFR or factor amounts to Gamma=3%.

A corresponding fault tree FT is displayed below.

Formula 3-Alternative 2

((Fire sensor S1:OR[24] OR Cable 1) AND ((Fire sensor S2:OR[24] OR Cable 2) OR ((Fire sensor S2:OR[24] OR Cable 1) AND Gamma=3%) OR CPU:OR[24, 25, 27, 28] OR Actuator:OR [32, 37]"

Please note that fire sensor S2 in Formula 3 above refers to a smoke detector and no longer to an infrared sensor.

The method and system for identifying and evaluating common cause failures CCF can be applied to any investigated technical system consisting of sub-systems and/or components. The technical or industrial system can be for instance a production facility or a power plant. The investigated system may also comprise mobile systems such as complex vehicles or any other complex devices. With the method and system according to embodiments of the present invention susceptibility of system components to common cause failures based on common cause influencing factors CCFIFs can be calculated automatically. Further, countermeasures to reduce the susceptibility of system components to common cause failures can be triggered according to a calculated quantitative common cause failure result CCFR such as a specific common cause failure result factor, in particular the beta factor of the IEC 61508 common cause failure model. The countermeasures can comprise technical countermeasures and/or organizational countermeasures. For instance, a requirement for a system to be built may specify that certain components forming a functional redundancy shall be maintained by different maintenance teams or persons. Further, components can be bought from different manufacturers. The method and system according to embodiments of the present invention can be employed in a planning or design phase but also in an operation phase of the investigated system. The investigated system can be represented by a digital twin stored in a local or remote database DB as shown in FIG. 19.

The system according to embodiments of the present invention can output an indication or description of the found susceptibility of one or more system components of the system to specific common cause failure influencing factors. The indication generated by the system can comprise structured data and/or results in text form such as: "at fluid tank both pressure sensors A, B building a redundancy in the system setup have been manufactured by the same manufacturer M and work according to same measurement principle, and consequently these sensors A, B have a certain susceptibility on common cause failures of the investigated system. The impact is for instance beta=5%."

In this simple example the probability that the two mentioned sensors A, B would fail at the same time can be 5% multiplied by the probability that a single sensor fails. The method and system according to embodiments of the present invention used for identifying and evaluating common cause failures for system components increases the safety, reliability and/or availability of investigated technical systems significantly. Further, the susceptibility of system components of the analyzed system to common cause failure influencing factors CCFIFs can be calculated automatically and fast. This allows to trigger countermeasures even during run time of the investigated system. The method according to embodiments of the present invention can be implemented by a program executed on one or more processing units as also illustrated in context with FIG. 19. The method can form part of a control software used for controlling a technical system. Further, the method can also form part of a design or planning tool used for designing or planning a technical system which may include organizational requirements.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for identifying and evaluating common cause failures of system components of a technical system and controlling the system components, comprising:
providing functional descriptions of the system components from a local memory of respective components or from a remote data storage or database;
automatically generating, by a processing unit, at least one analytical artifact for at least one applied system evaluation criterion based on the functional descriptions of the system components, wherein the at least one analytical artifact comprises a fault tree and/or a Markov chain;
processing the at least one analytical artifact and machine readable system related spatial data, topological data, and/or machine readable system related lifecycle data to analyze automatically a susceptibility of the system components to common cause failure based on common cause failure influencing factors; and
controlling the system components based on the processed at least one analytical artifact;
wherein a quantitative common cause failure result is calculated on the basis of a machine readable common cause failure model provided for common cause failure influencing factors; and
wherein at least one countermeasure is automatically triggered in response to the calculated common cause failure result, the at least one countermeasure being a technical measure selected from the group consisting of switching from a first sub-system to a second sub-system, segregating one or more of the system components, using different cable ducts, switching from a first component of the system components to a second component of the system components wherein the second component uses a different operating principle, and performing a calibration of a respective system component.

2. The method according to claim 1 wherein the at least one analytical artifact comprises a machine readable safety, reliability or availability related analytical artifact generated on the basis of a machine readable functional description of the technical system and at least one system evaluation criterion.

3. The method according to claim 2 wherein the at least one system evaluation criterion comprises at least one of
a reliability criterion,
an availability criterion, and
a safety criterion.

4. The method according to claim 2, wherein the machine readable functional description of a system component comprises at least one of
port definitions of input and output ports of the system component,
component failure modes,
an internal state or states of the component,
a failure rate,
a maintenance activity,
an inspection interval,
a mean down time, and
a mean time to repair.

5. The method according to claim 1, wherein the system components of the technical system have associated machine readable functional descriptions including port definitions and component failure mode descriptions.

6. The method according to claim 1, wherein the at least one analytical artifact comprises
a combination of fault tree(s) and Markov chain(s),
a failure modes and effects analysis,
a failure modes, effects, and criticality analysis, or
a failure modes, effects, and diagnostic analysis.

7. The method according to claim 6, wherein at least one of the fault tree and the Markov chain are provided by
transforming at least one system evaluation criterion into one or more corresponding relevant state patterns at ports forming a system boundary of the technical system and by
generating the fault tree and/or the Markov chain on the basis of the relevant state patterns and on the basis of failure modes of the components of the technical system.

8. The method according to claim 6, wherein the at least one analytical artifact is provided by
transforming at least one system evaluation criterion into one or more corresponding relevant state patterns at ports at the system boundary and/or at ports inside of the technical system and by
generating the analytical artifact on the basis of the relevant state patterns and on the basis of component failure mode descriptions of the components of the technical system.

9. The method according to claim 8 comprising
transforming the at least one system evaluation criterion into at least one system state that is represented by a state pattern,
applying the state pattern to input ports and output ports of the system boundary of the technical system,
deriving relevant system failure events by automatically taking into account the failure propagation mechanisms based on machine readable functional descriptions of the technical system's components including the component failure mode descriptions, and
assembling the derived failure events to generate at least one of the fault tree and the Markov chain used as an analytical artifact.

10. The method according to claim 1, wherein the machine readable system related lifecycle data comprises data regarding system design, system testing, system history, system component history, training data, data regarding planned or implemented operation procedures and/or maintenance procedures concerning the technical system.

11. The method according to claim 1, wherein the at least one countermeasure further includes an organizational measure.

12. The method according to claim 11 wherein the organizational measure is selected from the group consisting of requiring additional training and deploying a maintenance team.

13. The method according to claim 1, wherein the common cause failure model comprises the IEC 61508 common cause failure model used to calculate a beta factor as a quantitative common cause failure result.

14. The method according to claim 1, wherein the spatial data or the topological data comprise data regarding at least one of an arrangement and placement of system components within the technical system, in particular position coordinates and/or distances between system components.

15. The method according to claim 1, wherein the common cause failure influencing factors comprise
spatial proximity,
design principles,
technologies,
manufacturers,
lifecycle facts,
level of redundancy,
diversity within implemented redundancies, and/or
complexities.

16. The method according to claim 1, wherein the system components comprise
hardware components,
software components to be executed by hardware components, and
embedded components.

17. A system for identification and evaluation of common cause failures of a technical system of interest comprising system components, and for controlling the technical system of interest, the system comprising:
a database which stores a digital twin of the technical system of interest including machine readable system related spatial data, topological data, and/or machine readable system related lifecycle data; and
a processing unit adapted to
obtain functional descriptions of the system components from the database and to process the functional descriptions to automatically generate at least one analytical artifact for the technical system of interest for at least one applied system evaluation criterion, wherein the at least one analytical artifact comprises a fault tree and/or a Markov chain,
process the at least one analytical artifact and the machine readable system related-spatial data, the topological data, and/or the machine readable system related lifecycle data to automatically analyze a susceptibility of the system components of said technical system of interest to common cause failures based on common cause failure influencing factors, and
control the system components based on the processed at least one analytical artifact;
wherein the processing unit comprises at least one processor adapted to calculate a quantitative common cause failure result on the basis of a machine readable common cause failure model provided for common cause failure influencing factors; and
wherein at least one countermeasure is automatically triggered in response to the calculated common cause failure result, the at least one countermeasure being a technical measure selected from the group consisting of switching from a first sub-system to a second sub-system, segregating one or more of the system components, using different cable ducts, switching from a first component of the system components to a second component of the system components wherein the second component uses a different operating principle, and performing a calibration of a respective system component.

18. The system according to claim 17 wherein the at least one countermeasure further includes an organizational measure.

19. The system according to claim 17 wherein the processing unit comprises a user interface adapted to output the calculated quantitative common cause failure result and/or a control interface adapted to output a control signal in response to the calculated quantitative common cause failure result.

20. The system according to claim 17, wherein the common cause failure influencing factors comprise
spatial proximity,
design principles,
technologies,
manufacturers,
lifecycle facts,
level of redundancy,
diversity within implemented redundancies, and/or
complexities.

* * * * *